(12) United States Patent
Fisher

(10) Patent No.: US 7,228,309 B1
(45) Date of Patent: Jun. 5, 2007

(54) FACILITATING MAINTENANCE OF INDEXES DURING A REORGANIZATION OF DATA IN A DATABASE

(75) Inventor: Wayne E. Fisher, Sugarland, TX (US)

(73) Assignee: NEON Enterprise Software, Inc., Sugarland, TX (US)

(*) Notice: Subject to any disclaimer, the term of this patent is extended or adjusted under 35 U.S.C. 154(b) by 54 days.

(21) Appl. No.: 09/991,304

(22) Filed: Oct. 19, 2001

(51) Int. Cl.
G06F 17/00 (2006.01)

(52) U.S. Cl. .................. 707/102; 707/200

(58) Field of Classification Search .......... 707/101, 707/200, 100
See application file for complete search history.

(56) References Cited

U.S. PATENT DOCUMENTS

| | | | |
|---|---|---|---|
| 5,644,696 A | 7/1997 | Pearson et al. | |
| 5,745,748 A | 4/1998 | Ahmad et al. | |
| 5,761,667 A | 6/1998 | Koeppen | 707/101 |
| 5,881,379 A | 3/1999 | Beier et al. | 707/101 |
| 5,917,904 A | 6/1999 | Theis | |
| 5,933,820 A | 8/1999 | Beier et al. | 707/1 |
| 5,991,761 A | 11/1999 | Mahoney et al. | 707/100 |
| 6,092,086 A | 7/2000 | Martin et al. | 707/202 |
| 6,343,296 B1* | 1/2002 | Lakhamraju et al. | 707/103 R |
| 6,349,299 B1 | 2/2002 | Spencer et al. | |
| 6,411,964 B1* | 6/2002 | Iyer et al. | 707/200 |
| 6,418,443 B1 | 7/2002 | Martin, Jr. | |
| 6,571,251 B1 | 5/2003 | Koski et al. | |
| 6,606,631 B1 | 8/2003 | Martin, Jr. et al. | |
| 6,622,142 B1 | 9/2003 | Murray et al. | |
| 6,691,121 B1 | 2/2004 | Heronimus et al. | |
| 6,763,499 B1 | 7/2004 | Friedman et al. | |
| 6,859,455 B1 | 2/2005 | Yazdani et al. | |
| 2002/0059279 A1 | 5/2002 | Kim et al. | |
| 2002/0120925 A1 | 8/2002 | Logan | |
| 2002/0143763 A1* | 10/2002 | Martin et al. | 707/7 |
| 2003/0046294 A1 | 3/2003 | Heronimus | |
| 2003/0088572 A1* | 5/2003 | Smith | 707/100 |
| 2003/0135478 A1* | 7/2003 | Marshall et al. | 707/1 |
| 2004/0024778 A1 | 2/2004 | Cheo | |

OTHER PUBLICATIONS

Gillenson "Physical design equivalencies in database conversion", ACM 1990, pp. 120-131.*

(Continued)

Primary Examiner—Uyen Le
(74) Attorney, Agent, or Firm—Michael P. Adams; Winstead PC

(57) ABSTRACT

An index can be maintained during a reorganization of data in a database by retaining each root segment, or the prefix component of each root segment, in its storage location during the reorganization. Correction of an index after a reorganization of data in a database can be facilitated by assigning a unique token to each target segment, or the prefix component of each target segment, and each corresponding index entry having an address to a target segment, prior to a reorganization of data. The unique token for a given target segment, or the prefix component for a given target segment, and the unique token for a corresponding index entry are the same. After a reorganization of data in the database, the unique token of a first index entry is read. Then, the unique token of each target segment, or the prefix component of each target segment, is read until a match is found.

39 Claims, 21 Drawing Sheets

Secondary Index After Reorganizing

OTHER PUBLICATIONS

Lusk et al "A practical desing methodology for the implementation of IMS databases, using the entity-relationship model", ACM 1980, pp. 9-21.*

Biliris et al "A high performance configurable storage manager", IEEE 11995, pp. 35-43.*

Park et al "Optimal database reorganization policies: a stochastic control approach", IEEE 1989, pp. 752-761.*

Wietrzyk et al "ADDROL: a method for on-line reorganization in a multi-system DBMS with shared disks", IEEE 2000, pp. 378-383.*

Tsichritzis et al, "Hierarchical Data-Base Management: A Survey", ACM 1976, Computing Surveys, vol. 8, No. 1, Mar. 1976, pp. 105-123.*

"Change Recording Facility for IMS," BMC Software, http://www.bmc.com/rs-.../bmcdoc.html?dmw_objectid=090032018006e09a&dmw_format=htm, printed Feb. 3, 2001, 3 pages.

"Fast Reorg Facility/EP," BMC Software, http://www.bmc.com/products/proddocview.html?id=2061&r=Americas&l=en, printed Feb. 2, 2001, 1 page.

"Partitioned Database Facility (PDF™)," Neon Systems, Inc., http://www.neonsys.com/products/enterprise_subsystem/pdf.asp, printed Feb. 1, 2001, 4 pages.

"Secondary Index Utility," BMC Software, http://www.bmc.com/rs-.../bmcdoc.html?dmw_objectid=090032018007d08d&dmw_format=htm, printed Feb. 2, 2001, 3 pages.

Testing for Indoubt Units of Work in a Transaction Processing System, Jan. 1, 1996, IBM Technical Disclosure Bulletin, vol. 39, No. 1, pp. 329-330.

DL/1 Subset File Organization and Access Technique, Mar. 1, 1980, IBM Technical Disclosure Bulletin, vol. 22, No. 10, pp. 4702-4708.

Gillenson, "Physical Design Equivalencies in Database Conversion," ACM 1990, pp. 120-131.

Lusk, et al., "A Practical Design Methodology for the Implementation of IMS Databases, Using the Entity-Relationship Model," ACM 1980, pp. 9-21.

Biliris, et al., "A High Performance Configurable Storage Manager," IEEE 11995, pp. 35-43.

Park, et al., "Optimal Database Reorganization Policies: A Stochastic Control Approach," IEEE 1989, pp. 752-761.

Weitrzyk, et al., "ADDROL: A Method for On-Line Reorganzation in a Multi-System DBMS with Shared Disks," IEEE 2000, pp. 378-383.

* cited by examiner

Current IMS Database
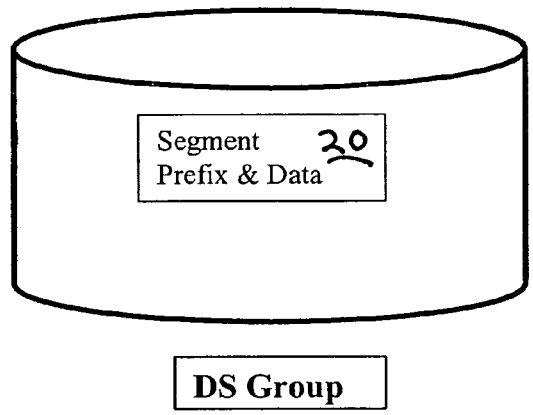
DS Group
Fig 1A
(Prior Art)
Invention Database
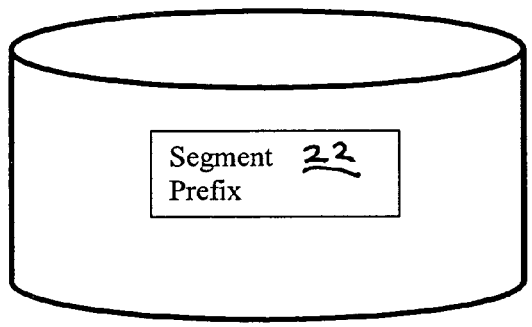
Directory DS
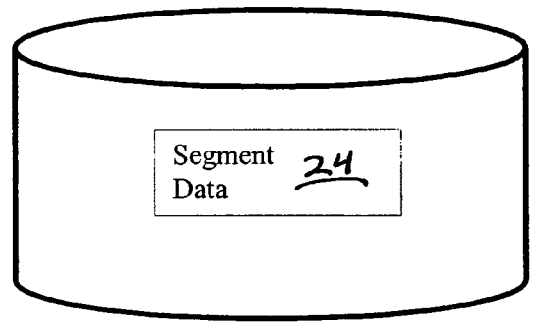
Segdata DS
Fig 1B

Layout of Segment in Directory Dataset

| Segment Prefix  26 | | Segment Data  28 | |
|---|---|---|---|
| Seg Code & Delete Byte  30 | Prefix Pointers  32 | Pointer to Seg Data  34 | Metadata |
| | | | Seg Key  38 | Born-On-Date  36 |

Figure 2A. Split Segment Composition – Prefix Portion with Metadata in segment data portion

Layout of Segment in Segdata Dataset

| Segment Prefix  26 | | | Seg Data  28 |
|---|---|---|---|
| Seg Code & Delete Byte  30 | Prefix Pointers  32 | Metadata | Pointer to Seg Data  34 |
| | | Seg Key  38 | Born-On-Date  36 | |

Figure 2B. Split Segment Composition – Prefix Portion with Metadata in segment prefix portion

Layout of Segment in Segdata Dataset

| Segment Prefix 40 | Segment Data 42 | Trans-parent 44 |
|---|---|---|
| Seg code & delete byte 46 | User Data 48 | Born on Date 50 |

Fig. 3

```
DBD     NAME=IVPDB1,ACCESS=(HIDAM,OSAM)                              122

DIR     DD1=DFSIVD1,SIZE=2048,UOW=(500,50,10)

DATASET DD1=DFSIVD1A,DEVICE=3380,SIZE=2048
SEGM    NAME=A1111111,PARENT=0,BYTES=40,RULES=(LLV,LAST),PTR=(TB,CTR)
FIELD   NAME=(A1111111,SEQ,U),BYTES=010,START=00001,TYPE=C
FIELD   NAME=A9999999,BYTES=010,START=00011,TYPE=C
LCHILD  NAME=(A1,IVPDB1I),POINTER=INDX,RULES=LAST
LCHILD  NAME=(A1X,IVPDB1X),POINTER=INDX
XDFLD   NAME=AXXXXXXX,SEGMENT=A1111111,SRCH=(A9999999)
LCHILD  NAME=(C1X,IVPDB1Z),POINTER=INDX
XDFLD   NAME=CXXXXXXX,SEGMENT=C1111111,SRCH=(C9999999)

DATASET DD1=DFSIVD1B,DEVICE=3380,SIZE=4096
SEGM    NAME=B1111111,PARENT=A1111111,BYTES=(1000,50),                X
            RULES=(LLV,LAST),PTR=(TB)
FIELD   NAME=(B1111111,SEQ,M),BYTES=010,START=00003,TYPE=C
FIELD   NAME=/SXB1
LCHILD  NAME=(B1X,IVPDB1Y),POINTER=INDX
XDFLD..NAME=BXXXXXXX,SEGMENT=B1111111,SRCH=(B1111111),SUBSEQ=(/SXB1)

DATASET DD1=DFSIVD1C,DEVICE=3380,SIZE=8192
SEGM    NAME=C1111111,PARENT=B1111111,COMPRTN=(DFSKMPX0,DATA,INIT),   X
            RULES=(LLV,LAST),PTR=(TB),BYTES=(8000,50)
FIELD   NAME=(C1111111,SEQ,U),BYTES=010,START=00003,TYPE=C
FIELD   NAME=C9999999,BYTES=010,START=00011,TYPE=C

DIRGEN

DBDGEN
FINISH
END
```

Figure 4A Sample HIDAM DBD

```
DBD     NAME=IVPDB2,ACCESS=HDAM,RMNAME=(DFSHDC40,4,1000)              124

DIR   DD1=DFSIVD2,UOW=(100,10)

DATASET DD1=DFSIVD2A,DEVICE=3380,SIZE=2048
SEGM    NAME=A1111111,PARENT=0,BYTES=40,RULES=(LLL,LAST),              X
            COMPRTN=(DFSKMPX0,DATA,INIT)
FIELD   NAME=(A1111111,SEQ,U),BYTES=010,START=00001,TYPE=C

DATASET DD1=DFSIVD2B,DEVICE=3380,SIZE=4096
SEGM    NAME=B1111111,PARENT=A1111111,BYTES=(1000,50),                 X
            RULES=(LLV,LAST),PTR=(TB)
FIELD   NAME=(B1111111,SEQ,U),BYTES=010,START=00003,TYPE=C

DATASET DD1=DFSIVD2C,DEVICE=3380,SIZE=8192
SEGM    NAME=C1111111,PARENT=B1111111,COMPRTN=(DFSKMPX0,DATA,INIT),
        RULES=(LLV,LAST),PTR=TB,BYTES=8000
FIELD   NAME=(C1111111,SEQ,U),BYTES=010,START=00001,TYPE=C

DIRGEN

DBDGEN
FINISH
END
```

Figure 4B Sample HDAM DBD

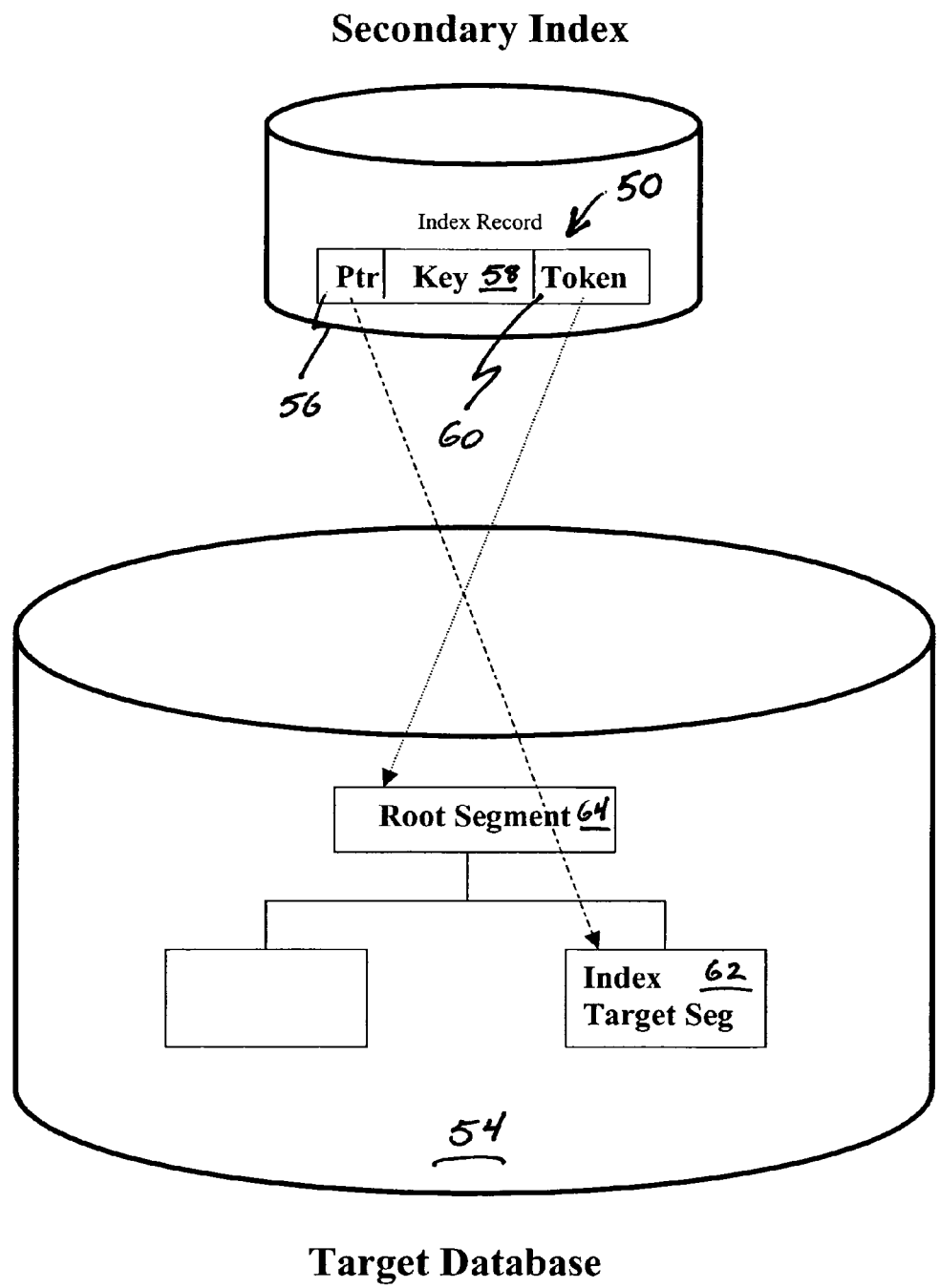
Figure 5 Secondary Index Architecture

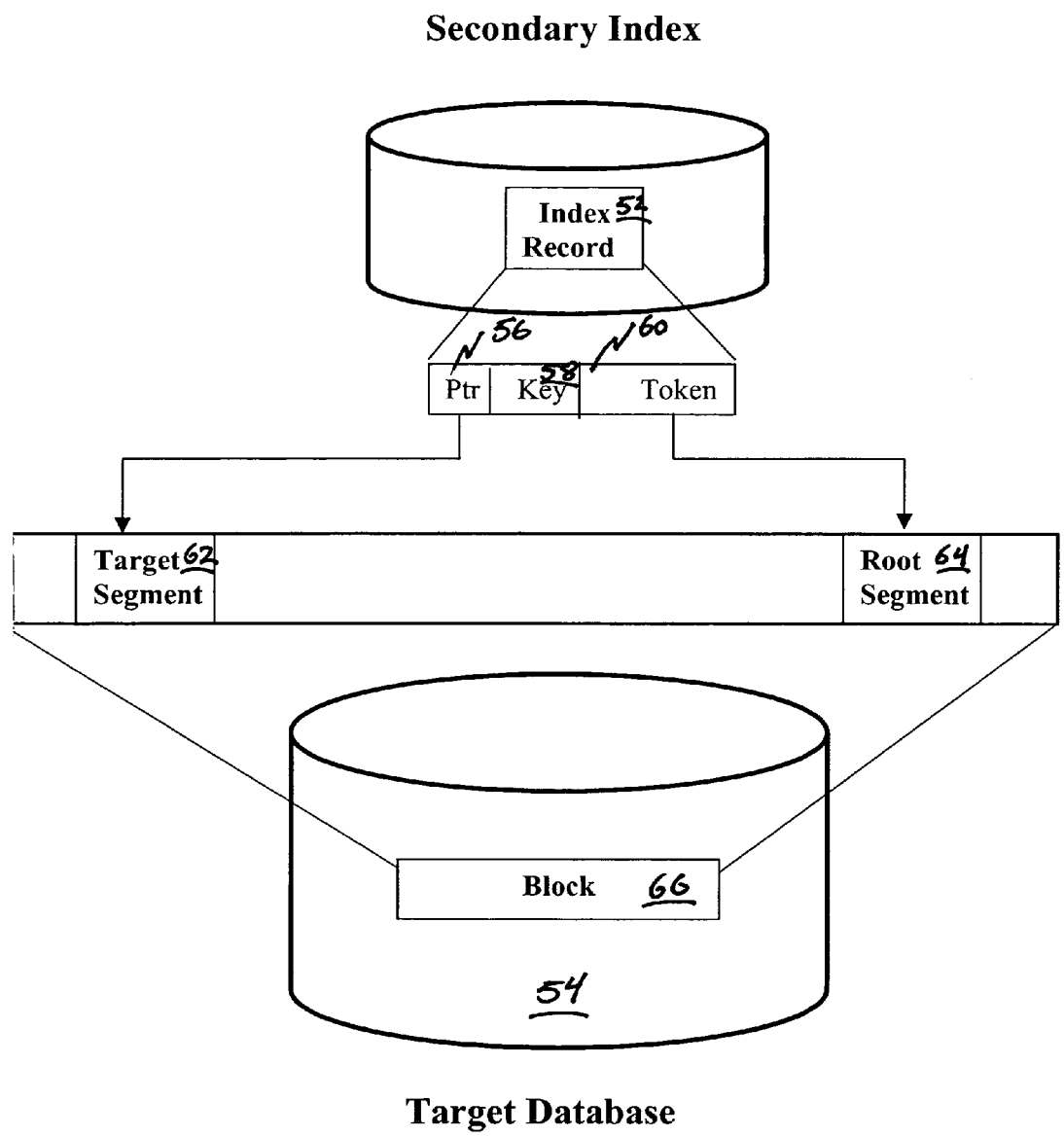
Figure 6 Secondary Index Before Reorganizing

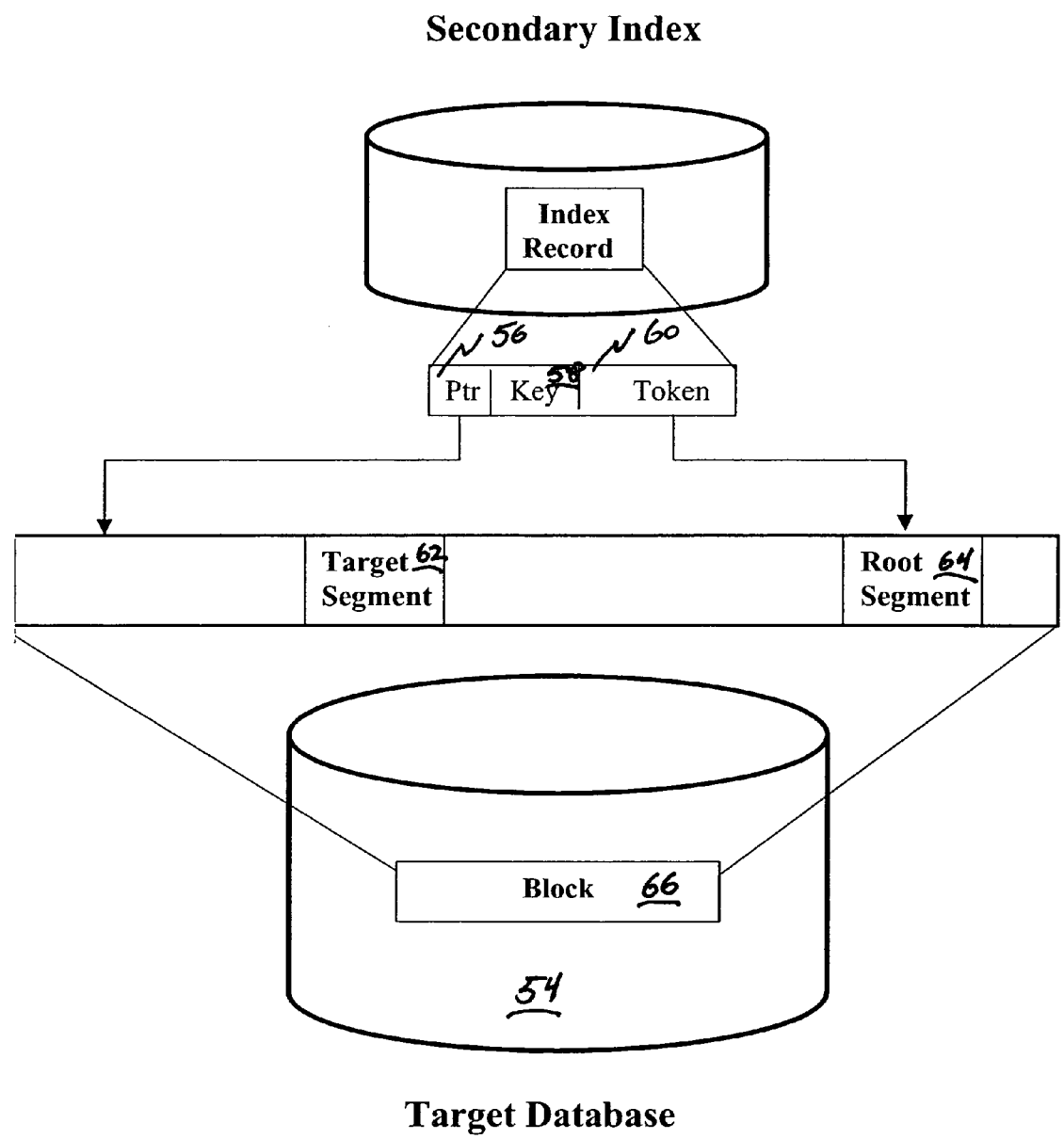
Figure 7 Secondary Index After Reorganizing

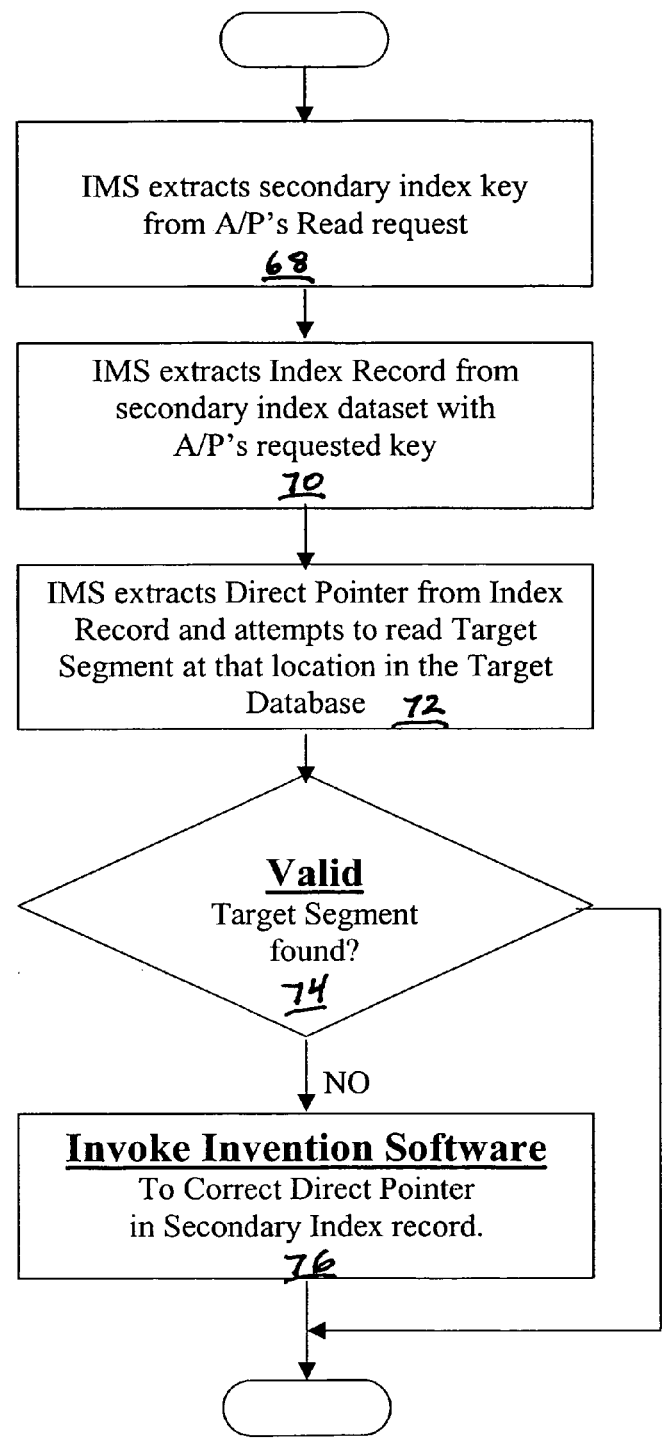
Figure 8 Retrieving a Target Segment via a Secondary Index

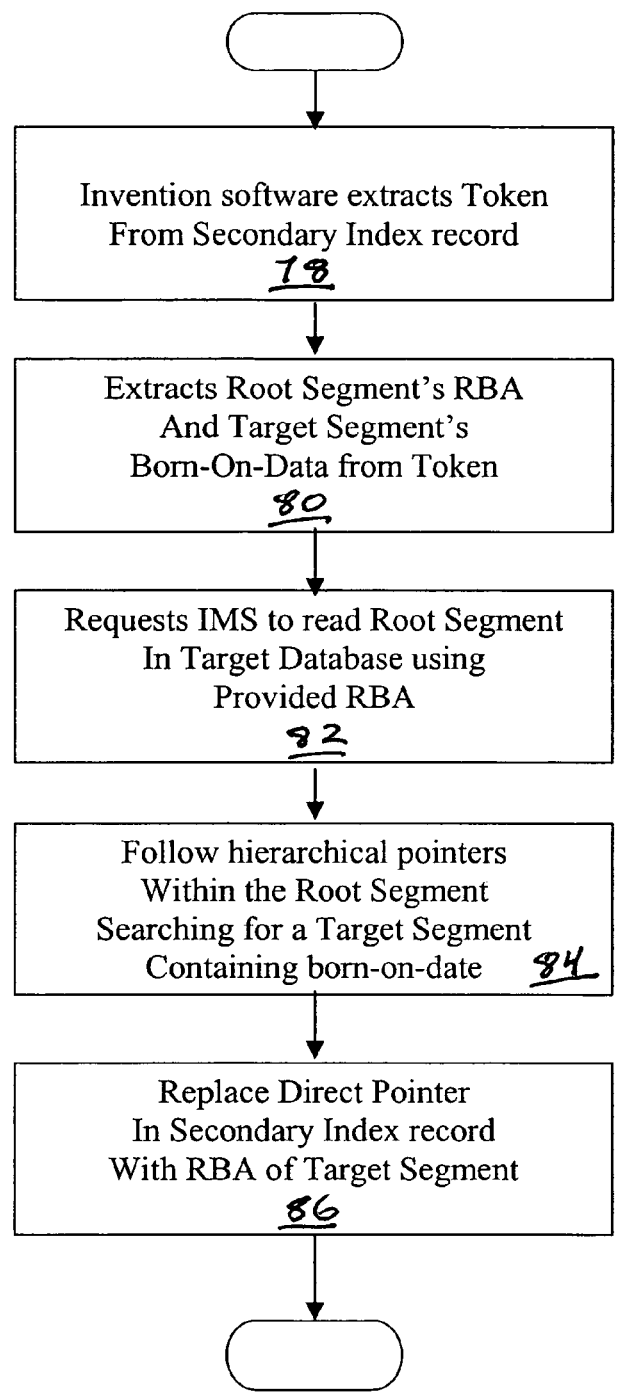
Figure 9 Correcting Direct Pointer in a Secondary Index

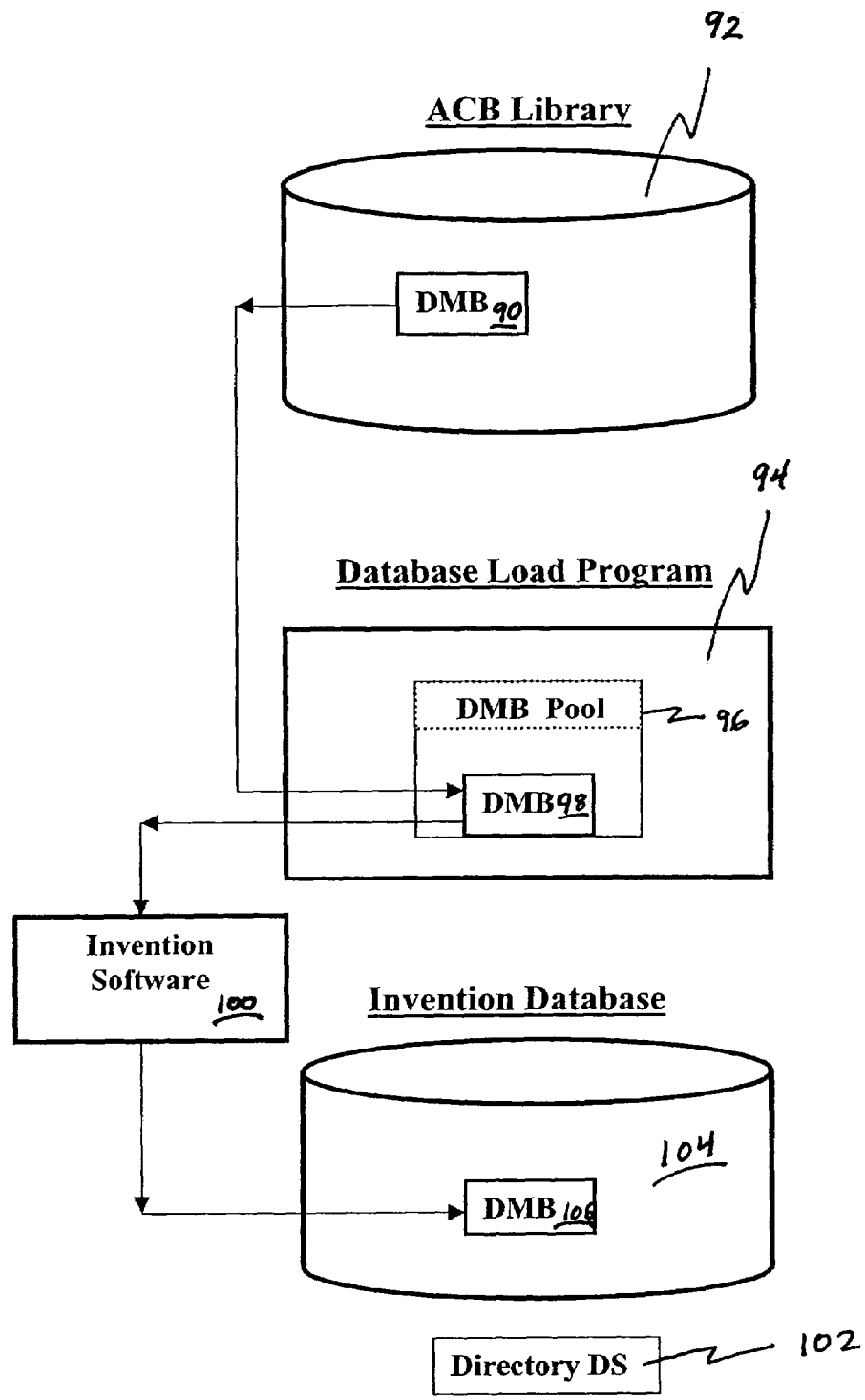
Figure 10 Saving the Database Definition at DB Load Time

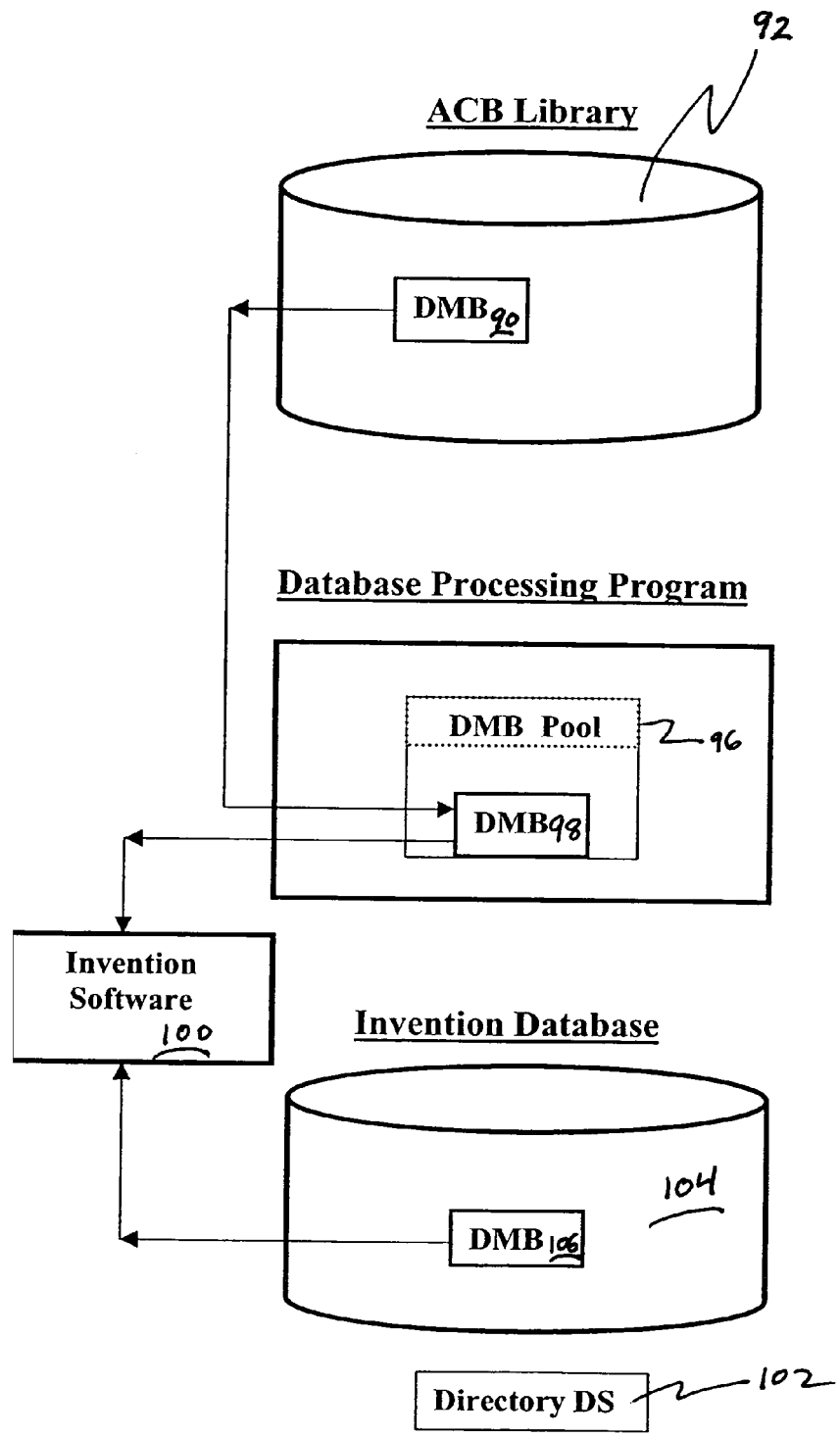
Figure 11 Checking the Database Definition at DB Processing Time

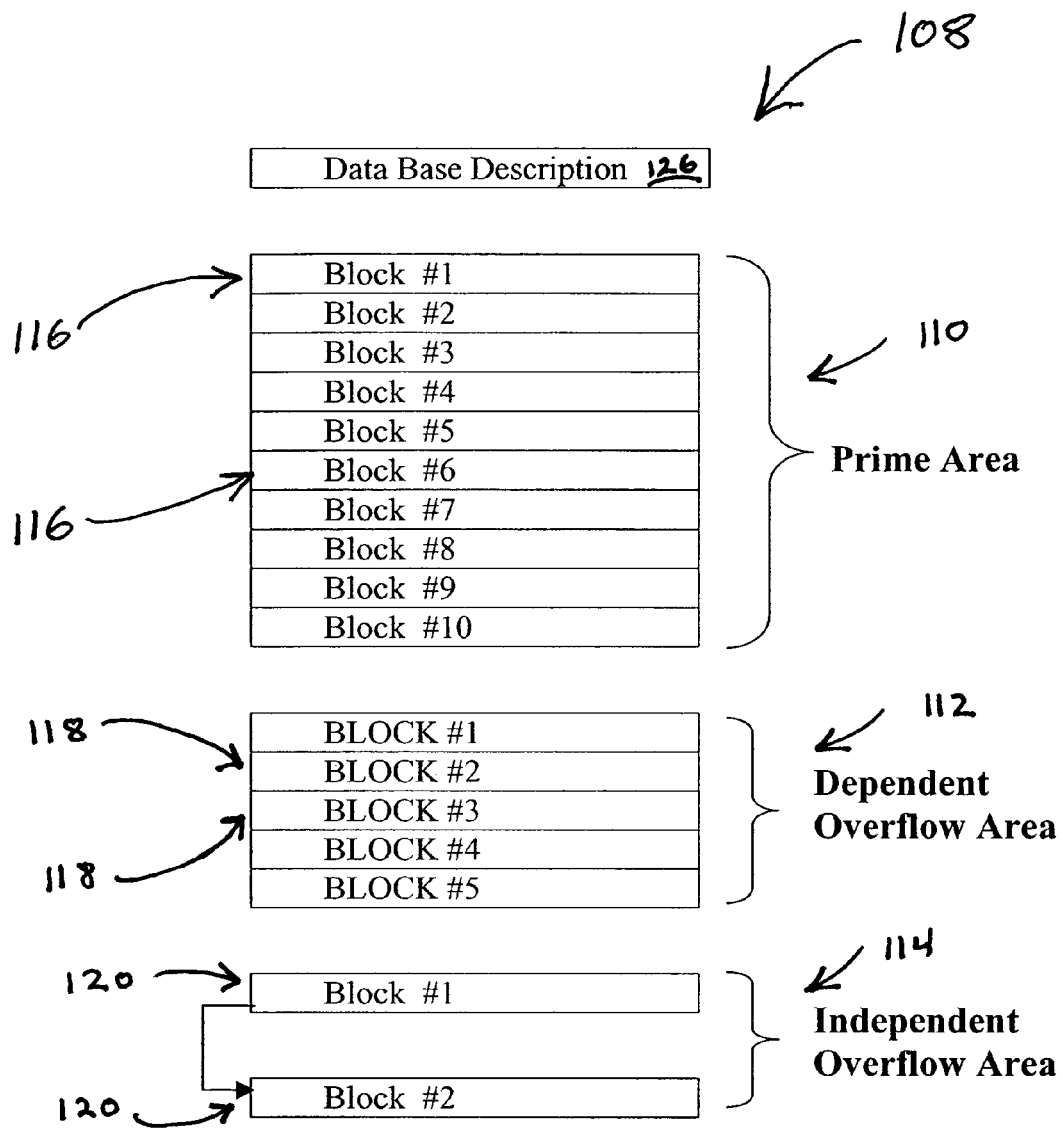
Figure 12. Unit Of Work (UOW) Architecture

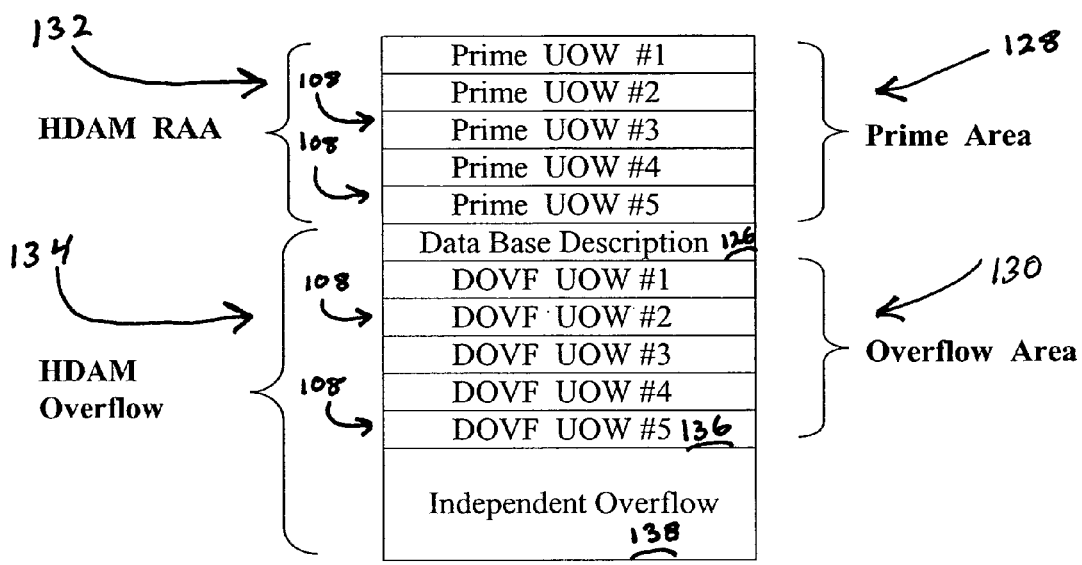
Figure 13. HDAM UOW Architecture

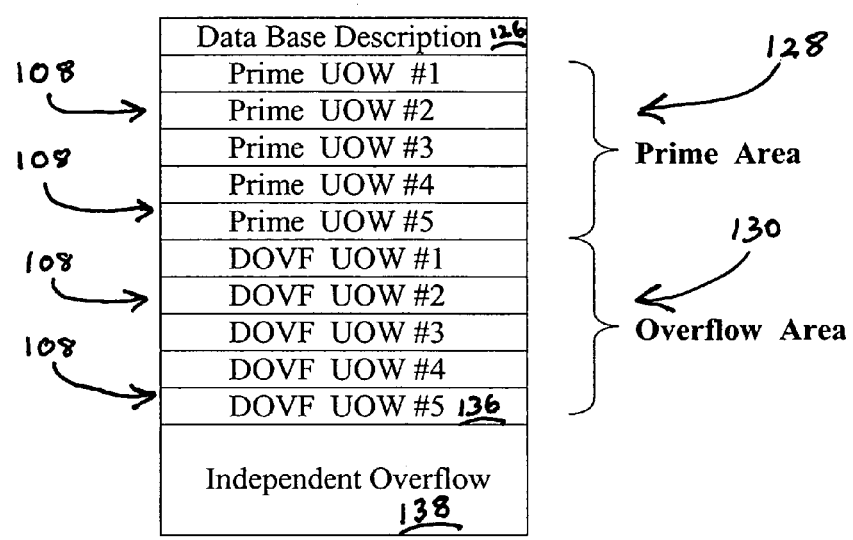
Figure 14. HIDAM UOW Architecture

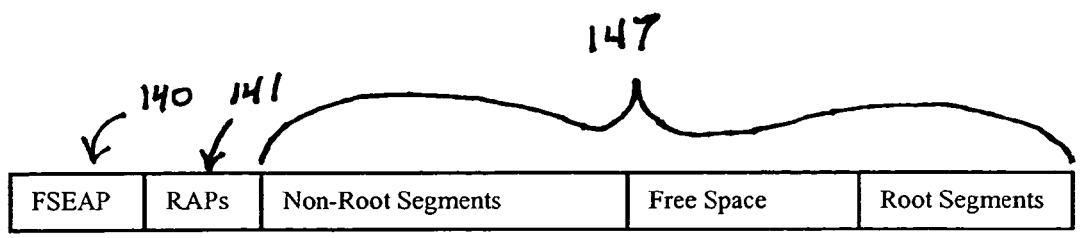
Figure 15. Prime & DOVF Block Composition
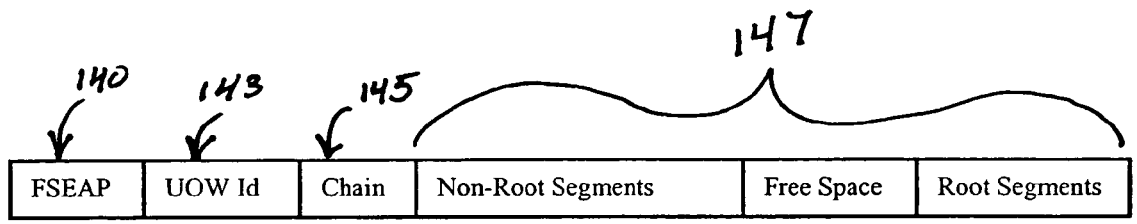
Figure 16. IOVF Block Composition

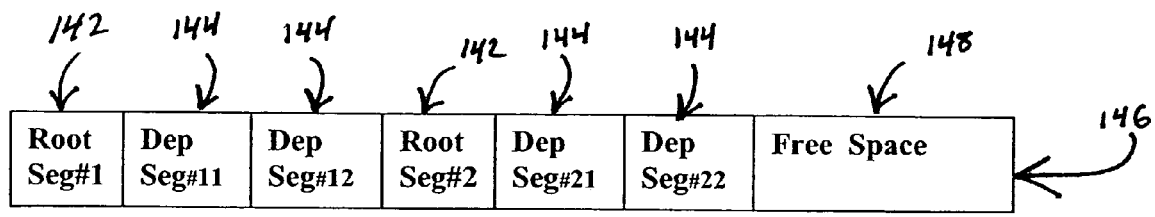
Figure 17 Block Composition Using IMS' Space Management
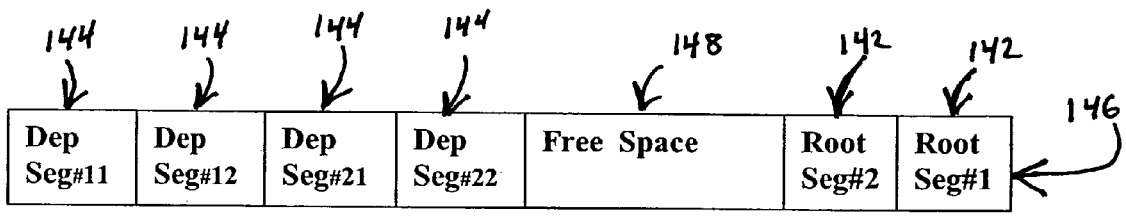
Figure 18 Block Composition Using Invention's Space Management

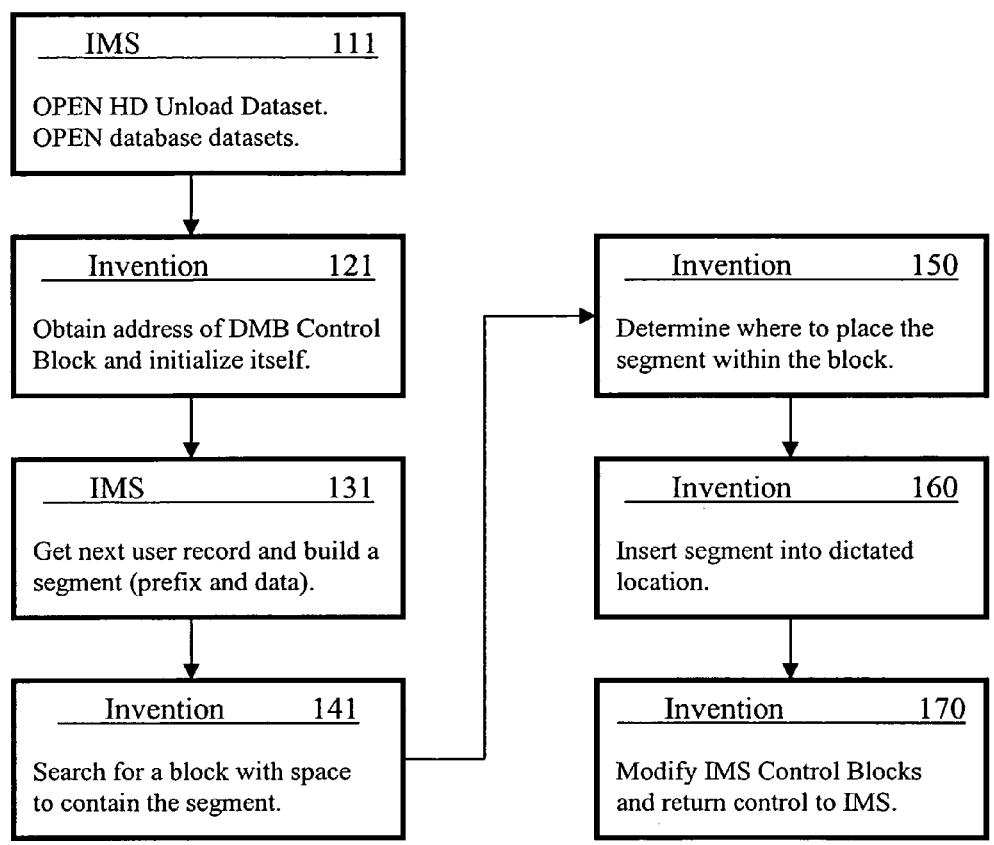
Figure 19  Space Management at Database Load Time

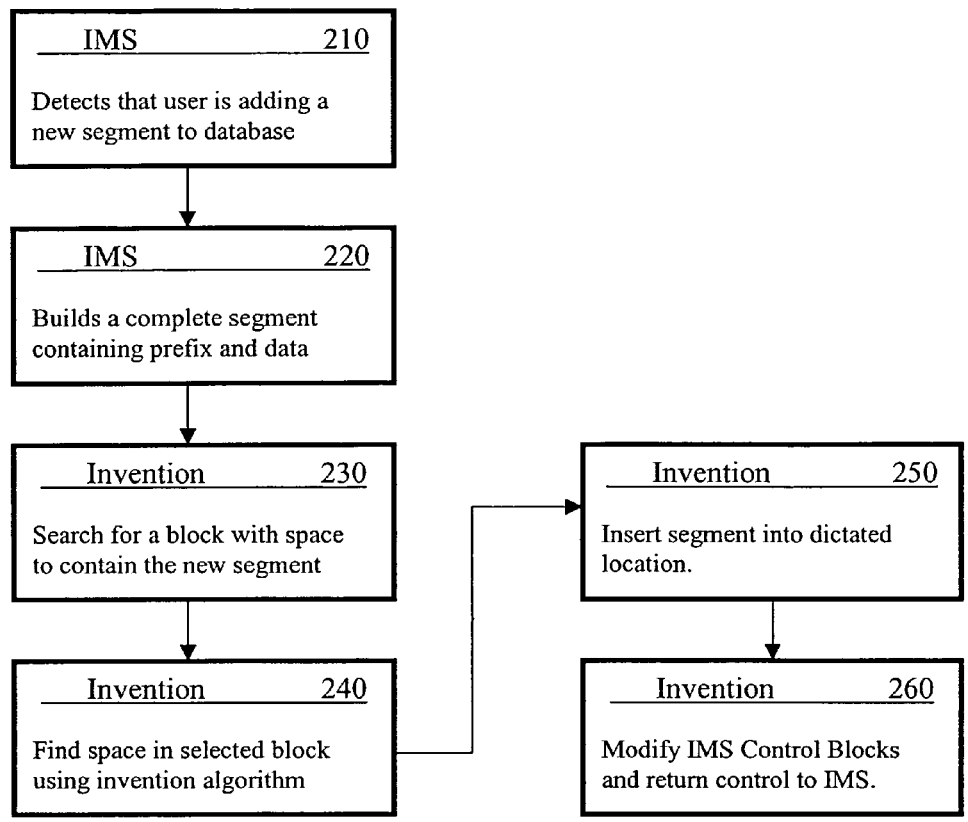
Figure 20 Space Management at Database Update Time

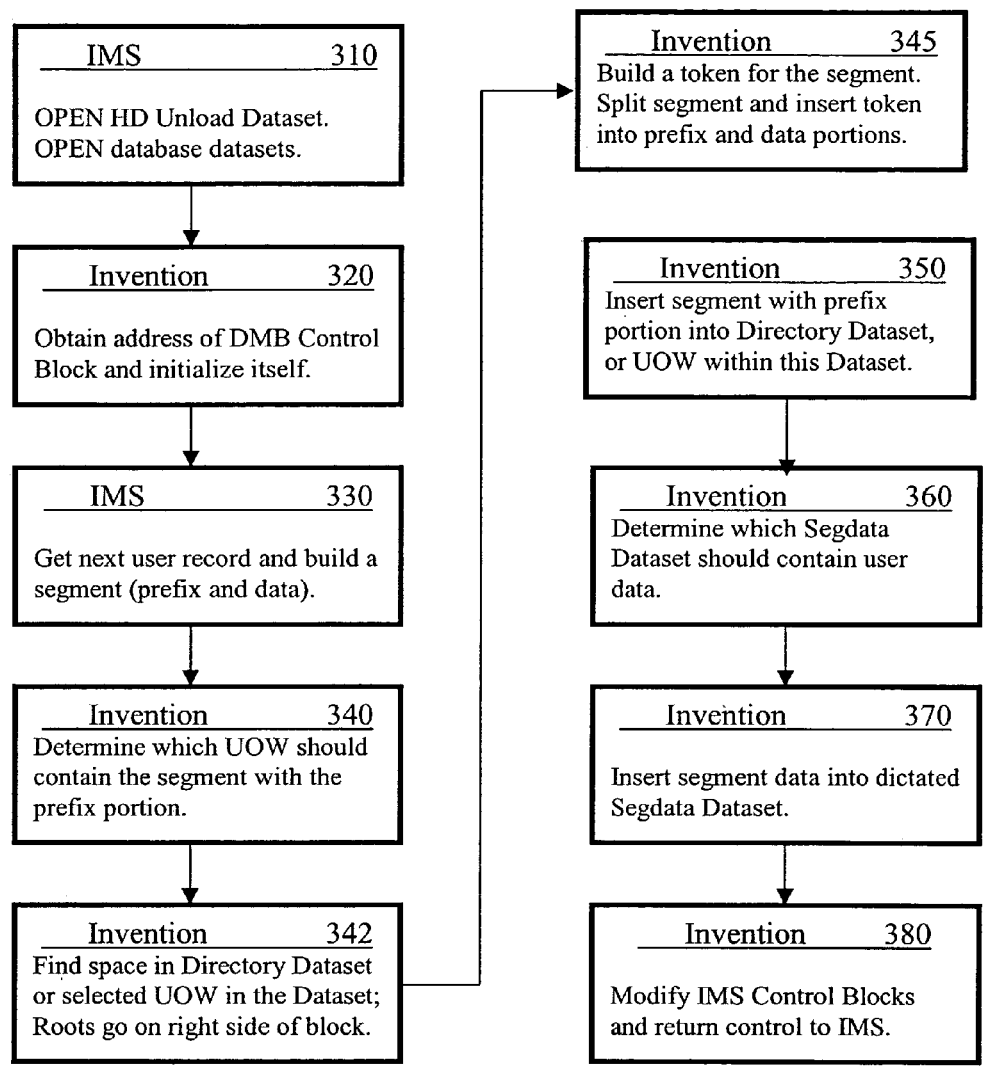
Figure 21. Space Management at Database Load Time

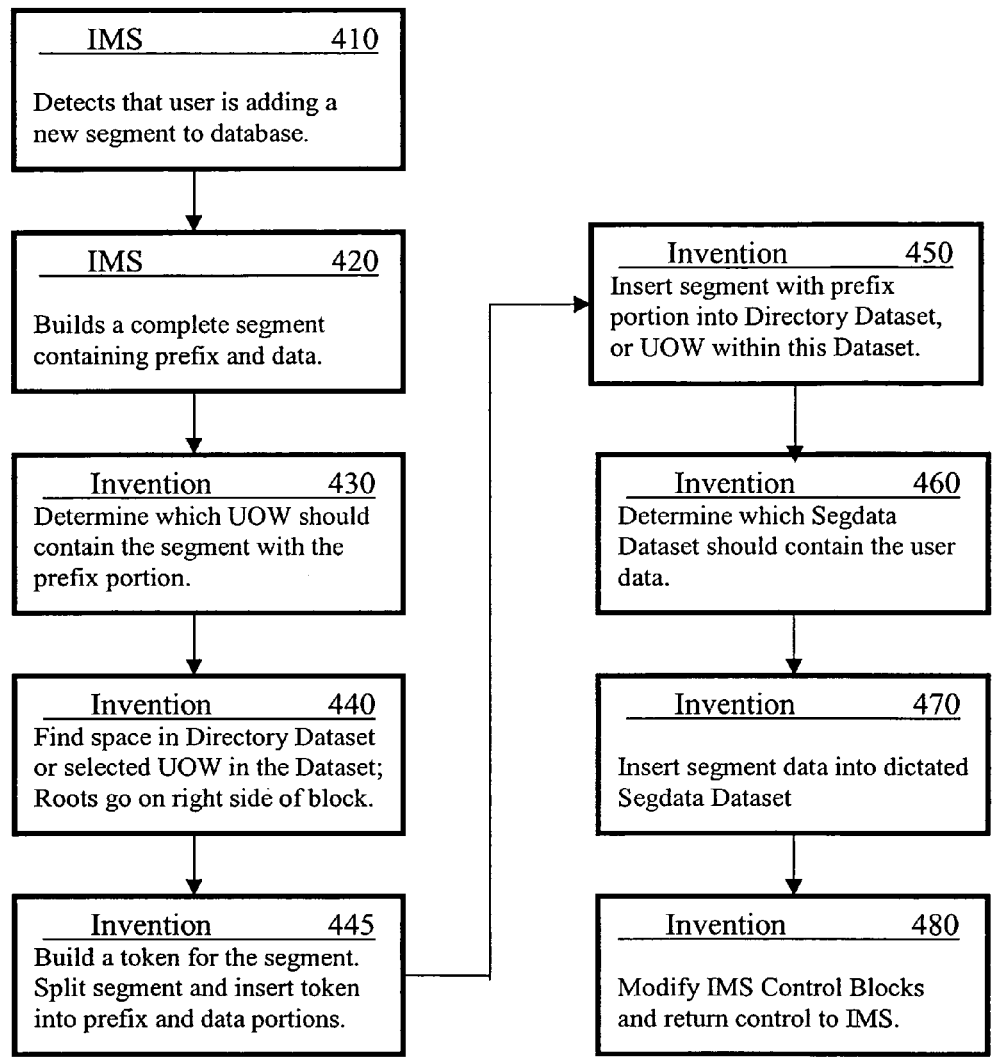
Figure 22. Space Management at Database Update Time

FACILITATING MAINTENANCE OF INDEXES DURING A REORGANIZATION OF DATA IN A DATABASE

CROSS REFERENCE TO RELATED APPLICATIONS

The present application is related to the following applications filed on the same date herewith, all of which are assigned to same assignee as the present invention, and all of which are hereby incorporated by reference and made a part hereof as if fully set forth herein: U.S. patent application Ser. No. 10/037,933, Space Management Of An IMS Database; U.S. patent application Ser. No. 10/036,069, Splitting Prefix And Data Components Of Each Segment In A Database; U.S. patent Ser. No. 10/036,786, Employing A Unit Of Work Methodology To Facilitate Reorganization And User Controlled Placement Of Data In Databases; and U.S. patent application Ser. No. 10/036,815, Ensuring That A Database And Its Description Are Synchronized.

BACKGROUND OF THE INVENTION

1. Field of the Invention

This invention relates to facilitating the maintenance of indexes during a reorganization of data in a database.

2. Description of the Related Art

IBM's Information Management System (IMS) is a widely used database management system. IMS "implemented the hierarchical model tree structure to organize the collection of records in a one-to-many entity-relationship data model." K. R. Blackman, *IMS Celebrates Thirty Years as an IBM Product*, IBM Systems Journal, Vol. 37, No. 4, 596 (1998). Today, a large percentage of the top worldwide companies in the areas of manufacturing, finance, banking, retailing, aerospace, communications, government, insurance, high technology, and health care use IMS to run their day-to-day database operations. Id. at 597.

"The IMS database (DB) function provides a full-function resource manager and a fast path resource manager for hierarchical database management. . . . The data managed by IMS are organized in hierarchical database records. A database record is composed of segments, a segment being the smallest piece of information that IMS can store. A segment contains fields that are the smallest pieces of data an application program can manipulate. A field is identified as a unique key field that can be used to navigate the database to find a specific segment. The hierarchical structure of the segments establishes the structure of the database record. A root segment identifies a database record, and a database record cannot exist without a root segment. Dependent segments are the pieces of data that complete the rest of a database record. The IMS DB full-function resource manager provides sequential access, indexed sequential access, and direct access for database processing. The fast path DB resource manager provides the direct method for processing data by using direct access pointers to the segments." Id. at 597–98. An OS dataset is a physical device on which an IMS database is stored.

A segment consists of two components: (1) prefix; and (2) data. The prefix portion of a segment contains information used by IMS to manage segments within a database, whereas the data portion of a segment contains the user's data.

"The fundamental architecture of IMS consists of a control region, a DLI secondary address space (DLISAS), a DBRC address space, an IRLM address space, and one or more dependent regions. The control region is the execution environment for the IMS system software, the control blocks, and storage pools required for managing communication access and application program scheduling. The control region also contains the fast path system software for managing access to fast path databases. This isolates the IMS system functions from the customer's application programs to maintain the integrity of the IMS system. The DLISAS execution environment contains the IMS DB full-function system software, control blocks, and storage pools for managing access to the full-function databases. The dependent regions provide the execution environments for the application programs to process transactions." Id. at 599.

Average IMS databases are increasing in size, resulting in the need for database capacity to be increased while, at the same time, database availability and performance is maintained or enhanced. Various solutions to this requirement have been developed. For example, Neon Systems, Inc. developed the Partitioned Database Facility (PDF™) product which has used a vertical database partitioning scheme to increase the VSAM capacity limit from 4 GB to 128 GB and the OSAM capacity limit from 8 GB to 256 GB, for IMS full function databases. The PDF has also enabled database reorganizations or other maintenance tasks to run concurrently, in parallel. In addition, the PDF product improved database response times versus non-partitioned databases. PDF was an enhancement to IMS versions that did not allow for such a database partitioning scheme. IMS Version 7.1 integrates a related partitioning scheme into the IMS product.

Despite improvements in database capacity, availability and performance, further improvement is needed. For example, the partitioning schemes discussed above encourage the retention of more data, which can degrade performance, and increase the number of datasets to be managed. Furthermore, these partitioning schemes require all the database data to be stored in more expensive direct access storage devices (DASDs) and cannot exploit less expensive and more modern storage technologies, such as storage area networks, virtual tape systems, or network attached storage. Therefore, a need exists for a solution which accommodates database growth, without impacting performance, and which exploits newer storage technologies. In addition, a need exists for database space to be used more efficiently. Because IMS databases become physically disorganized as the database is utilized and modified, they periodically need to be reorganized. The degree of disorganization is usually a function of the number of segments added, deleted, or updated. Segments being added or split as the result of an update tend to be physically located in a block other than their root segment or hierarchical predecessor. Subsequent retrieval of these new or split segments require additional DASD read requests, thus degrading the performance of the database. If a database is not reorganized, its performance degrades, at least in part because more I/O operations are required to retrieve data. Unloading and reloading a complete database is a common technique used to reorganize a database. However, this technique requires that the entire database be offline and unavailable during the period of time that that database is being reorganized.

When a database is reorganized, its primary and secondary indexes have to be updated as well. In fact, the process of updating indexes can be more time-consuming than reorganizing the database. In order to update these indexes, IMS has required that an indirect list, which is stored in a separate dataset, be built or completely updated before the indexes are updated. IBM has developed a system which does not require all the indexes to be updated, in a separate process, after a reorganization. See U.S. Pat. No. 5,881,379, which is incorporated herein by reference. Instead, a direct pointer is updated, by using an indirect pointer, only upon a first reference to the targeted data element that has moved during a reorganization. The IBM system still requires, however, that an indirect list be maintained. In IBM's system, this indirect list maintains both the old and new location of a target segment.

Techniques have been developed or proposed to reduce the percentage of data in the database that is reorganized at one time and/or the amount of time the database is offline and unavailable. However, such techniques generally require that all or portions of the database be offline and unavailable for a period of time which is still unacceptable and/or disruptive for many users.

BMC Software, Inc. (BMC) has marketed its Concurrent REORG Package as a near online database reorganization solution. According to BMC, its Concurrent REORG Package has allowed for complete database read access during a reorganization and for any updates to the database, which occur during a reorganization, to be captured and recovered. However, BMC's Concurrent REORG Package is a complex and expensive solution that has required a user to have the following prerequisite products:

Change Recording Facility™ for IMS
Unload Plus®/EP for IMS
Load Plus®/EP for IMS
Secondary Index Utility/EP
Fast REORG Facility/EP
Image Copy Plus Furthermore, BMC's Concurrent REORG solution has required that a shadow database be maintained during the reorganization process. In addition, once reorganization tasks are complete, a disruptive database outage would occur to allow updates, which were made during reorganization, to be applied to the database. Operator intervention is required to initiate the process of applying the updates.

Therefore, a need exists for a less complex and less expensive solution that enables an online, or near online, reorganization. In other words, a need exists for a less complex and less expensive reorganization solution in which complete read/write access to database data is maintained except for minimum portions of data which may be inaccessible only for brief, non-disruptive periods of time. A need also exists for an online, or near online, reorganization which does not require the creation of a shadow database, does not require a database outage at the conclusion of the reorganization, and does not require operator intervention to complete the process. Furthermore, a need exists for a reorganization solution that eliminates the need to correct or rebuild primary indexes, and which facilitates secondary indexes to be corrected more quickly and efficiently, with less effort, and without the need for using and maintaining an additional dataset with an up-to-date indirect list.

Furthermore, a need exists for a unit of work (UOW) methodology, which has only been available for Fast Path databases, to be available for full function HDAM and HIDAM databases. In addition, a need exists in IMS full function databases for allowing user-controlled placement of data.

In addition to the foregoing, a need exists for allowing the prefix and data components of "fixed" length segments to be split at load time. IMS has only allowed the prefix and data components of "variable" length segments to be split when the "variable" length segment is increased in length after database load time. Furthermore, IMS has required that the split components be stored in the same dataset. Therefore, a further need exists for allowing split prefix and data components to be stored in separate datasets, and for allowing user data to be stored in a type of storage device which is different from a DASD. A need also exists for reducing or eliminating the problem of data being stored in a DASD in a fragmented manner.

In addition, a need exists in IMS databases for ensuring that the database definition or description is synchronized with the actual database data. In IMS, the database description, called the data management block (DMB), is maintained in one or more datasets, which are different from the database dataset(s). A database description could be changed in such a way that it is different from or no longer synchronized with the actual database. In such circumstances, the database may malfunction during use. Therefore, a need exists for ensuring that this condition does not occur and/or the user is alerted to the problem.

SUMMARY OF THE INVENTION

The present invention includes aspects pertaining to: (i) splitting the segment's prefix from the segment's data in IMS full-function databases; (ii) maintaining indexes; (iii) ensuring that a database and its definition are synchronized; (iv) employing units of work in IMS full function databases; and (v) managing space within a DASD block.

Each segment in the database records of a database can be split into a prefix component and a data component. Each prefix component is provided with a data link to its corresponding data component. Such splitting may occur at database load time. The prefix component and data component are stored in different storage locations and possibly different storage devices. Fixed length segments may also be split. A unique token, containing metadata such as a born on date, can be assigned to each segment or each segment prefix component and segment data component.

An index can be maintained during a reorganization of data in a database by retaining each root segment, or the prefix component of each root segment, in its storage location during the reorganization. Correction of an index after a reorganization of data in a database can be facilitated by assigning a unique token to each target segment, or the prefix component of each target segment, and each corresponding index entry having an address to a target segment, prior to a reorganization of data. The unique token for a given target segment, or the prefix component for a given target segment, and the unique token for a corresponding index entry are the same. After a reorganization of data in the database, the unique token of a first index entry is read. Then, the unique token of each target segment, or the prefix component of each target segment, is read until a match is found between the unique token of a matching segment, or the prefix component of a matching segment, and the unique token of the first index entry. After a match is found, the address of the first index entry is replaced with the address of the matching segment, or prefix component of the matching segment. If the first index entry is associated with a particular database record, the search for a token which matches the first index entry's token can be focused on the segments for that database record. All the segments for a record can be stored within a single block of storage locations. Before the address of an index entry is corrected, it can be determined if the address is valid. The address of the index entry will then be corrected only if it is invalid.

Database records of an IMS full function database may be grouped into one or more units of work (UOWs). Alternatively, just the segment prefix components of one or more records can be placed in one or more UOWs. The user has the ability to select which UOW a given database record or segment prefix component is to be placed. While read and write access to a UOW is restricted temporarily, the UOW may be reorganized. While a UOW is being reorganized, read and write access can be maintained for any other UOWs in the database.

The present invention further includes a method of ensuring that an IMS database and its description are synchronized. A copy of the description used to load the database is stored and maintained within said database. Before the database is accessed, a copy of the description is compared with another copy of the description stored in a data management block. A determination is then made as to whether the copy of the description in the database and the copy of the description in the data management block are synchronized. Responsive action, such as alerting the user to a problem with the description, may occur if the database descriptions are not synchronized.

Space within an IMS database can be managed during loading or updating of the database. After an IMS database is loaded, a space management program can assume control from the IMS program for a period of time. During this period of time, the space management program obtains memory addresses of IMS control blocks built by the IMS program and further obtains information about the IMS database. When the IMS program attempts to insert data into the IMS database, either during loading or updating of the database, the space management program reassumes control from the IMS program. The space management program selects a storage location for the data to be stored, and modifies the IMS control blocks to indicate the storage location selected. The space management program may also insert the data into the storage locations selected. Control is then passed back to the IMS program. If segments are to be inserted into the IMS database, and such segments are to be split, then the space management program selects two storage locations for the components of the split segment to be stored. The storage locations selected by the space management program are selected based on IMS database user preferences.

Space management facilitates many of the features described above. For example, space management in accordance with the present invention can direct the placement of split segment prefixes and segment data into the appropriate datasets. Space management can also direct the placement of root segments into fixed storage locations to facilitate the maintenance of indexes. If UOWs are to be implemented, space management can further direct the placement of root and non-root segments, or segment prefixes, into the appropriate UOW. In addition, space management is responsible for the management of DASD space allocated to UOWs.

Employing the above-discussed features and functions of the present invention results in many advantages to IMS database users. Many of these advantages will be apparent to those skilled in the art. Some noteworthy advantages include improved database: (i) response time; (ii) availability; and (iii) capacity. For example, splitting segments and storing segment data in datasets separate from the directory dataset allows increased database capacity. The directory dataset can hold more database segments since it only stores the segment prefixes and not the segment data.

Since less data needs to be stored in the directory dataset, the database's response time may decrease and availability may increase. Furthermore, the segment data can be stored in less expensive and more modern storage technologies versus the storage used in the prior art.

If UOWs are employed, the data in an individual UOW may be reorganized while the other UOWs are on-line. This allows an on-line, or near on-line, and non-disruptive database reorganization. If the data in the UOWs is only segment prefix data, as a result of splitting, the unavailability of individual UOWs during reorganization is even more limited.

In addition, if the method of maintaining indexes is employed, after reorganization of a database or a UOW, the database is available for immediate use. There is no need, as in the prior art, to first rebuild the indexes before the database is available to the user. In the present invention, if root segments are not moved during reorganization, the primary index does not have to be rebuilt. The secondary index also does not need to be completely rebuilt before the database can be used. Instead, the secondary index can be updated over time as invalid pointers are encountered during accesses to non-root segments. Furthermore, an up-to-date indirect list does not have to be maintained.

BRIEF DESCRIPTION OF THE DRAWINGS

The present invention may be better understood, and its numerous objects, features, and advantages made apparent to those skilled in the art by referencing the accompanying drawings.

FIG. 1A illustrates a prior art IMS database structure;

FIG. 1B illustrates an IMS database structure, including a Directory Dataset and a Segdata Dataset, according to one aspect of the present invention;

FIGS. 2A and 2B illustrate possible layouts of a segment in a Directory Dataset;

FIG. 3 illustrates the layout of a segment in a Segdata Dataset;

FIG. 4A is a statement for implementing one aspect of the present invention for a HIDAM database;

FIG. 4B is a statement for implementing one aspect of the present invention for a HDAM database;

FIG. 5 illustrates the architecture for implementing an indexing aspect of the present invention;

FIG. 6 illustrates the status of an index, according to one aspect of the present invention, before reorganizing a target database;

FIG. 7 illustrates the status of an index, according to one aspect of the present invention, after reorganizing a target database;

FIG. 8 is a flow chart diagram illustrating the retrieval of a target segment;

FIG. 9 is a flow chart diagram illustrating the correction of a direct pointer;

FIG. 10 illustrates the process of saving the database description at database load time;

FIG. 11 illustrates the process of checking the database definition at database processing time;

FIG. 12 illustrates a unit of work architecture, according to one aspect of the present invention;

FIG. 13 illustrates a unit of work architecture for a HDAM Database, according to one aspect of the present invention;

FIG. 14 illustrates a unit of work architecture for a HIDAM Database, according to one aspect of the present invention;

FIG. 15 illustrates the prime and DOVF block composition, according to one aspect of the present invention;

FIG. 16 illustrates the IOVF block composition, according to one aspect of the present invention;

FIG. 17 illustrates block composition using the space management process of the IMS product;

FIG. 18 illustrates block composition using a space management process, according to one aspect of the present invention;

FIG. 19 is a flow chart diagram illustrating space management at database load time, according to one aspect of the present invention;

FIG. 20 is a flow chart diagram illustrating space management at database update time, according to one aspect of the present invention;

FIG. 21 is a flow chart diagram illustrating space management at database load time, according to another aspect of the present invention; and FIG. 22 is a flow chart diagram illustrating space management at database update time, according to another aspect of the present invention.

The use of the same reference symbols in different drawings indicates similar or identical items.

DESCRIPTION OF THE PREFERRED EMBODIMENT(S)

The present invention includes aspects pertaining to: (i) splitting the segment's prefix from the segment's data in IMS full-function databases; (ii) maintaining indexes; (iii) ensuring that a database and its definition are synchronized; (iv) employing units of work in IMS full function databases; and (v) managing space within a DASD block. Each of these aspects, as well as other features and functions of the present invention, are described below.

I. Splitting the Segment's Prefix from the Segment's Data

This aspect of the present invention relates to a method of implementing an architecture for the splitting of the segment's prefix from the segment's data, for an IMS HDAM or HIDAM database. As is well-known in the art, when a segment is inserted into a database the current methodology implemented by IBM's IMS program is to maintain a segment's prefix and data components physically together. In the present invention, these components can be separated and can be stored in the same or separate datasets. Also, the user data can reside in a different type of storage media from the storage media containing the segment prefix portion. For example, although the prefix component is typically stored in DASD storage media directly accessible by a mainframe, splitting allows the data in the data component to be stored is less expensive and more modern storage technologies, such as storage area networks, virtual tape systems, or network attached storage. The data in the data component may also be stored in archive storage. As further described below, the methodology used to connect these two separated portions of the segment is another feature of the present invention.

FIGS. 1A and 1B depict a database before and after a segment has been split according to the present invention. In a prior art IMS database structure, a database segment consists of a prefix component and a user data component. These two components (prefix and data) are typically stored physically adjacent to each other in a single dataset 20 on a DASD. This dataset is referred to as a Dataset Group. See FIG. 1A. If the segments are of a "fixed" length, IMS has not allowed these components to be separated. IMS has only allowed "variable" length segments to be separated if such segments are increased in length after database load time. Also, those variable length segments which have been separated must be stored in the same dataset.

In the present invention, the two components of a segment can be separated or split. The prefix component can be placed in one dataset 22 and the data component placed in another dataset 24. See FIG. 1B. The dataset containing the prefix component of a segment is hereinafter referred to as a Directory Dataset, whereas the dataset containing the data component of a segment is referred to as a Segdata Dataset. Alternatively, the two split components can be placed in different storage locations in the same dataset. Furthermore, "fixed" length segments can be split, and such splitting can occur at or after database load time.

FIG. 2A shows the layout of the prefix component of a segment according to one aspect of the present invention. It contains a standard IMS-required Segment Prefix 26, consisting of a segment code and delete byte 30, and a variable number of pointers 32. The prefix component also includes a Segment Data portion 28. Instead of user data, the Segment Data portion 28 of the prefix component of the segment can contain metadata unique to the present invention. The metadata can include: (i) information or data 34 required to link the segment prefix to its associated user data (e.g., an address or a pointer); (ii) a born on date 36 of the segment which gives it a unique identifier within the database (e.g., the number of seconds since the year 2000); (iii) the Key field 38 found in the user data; and/or (iv) any other data useful to carrying out the present invention. As illustrated in FIG. 2B, the Segment Data portion need not be of the same size as the Segment Data portion of a typical segment that includes customer data. In the present invention, the Segment Data portion may be larger or smaller than a typical Segment Data portion. For example, the Segment Data portion 28 in the present invention may only contain a data link 34 (e.g., four byte pointer) to where the Customer data is actually stored. If the delete byte 30 in the segment prefix 26 is modified to indicate that the segment is split, IMS expects to only find a four byte pointer after the prefix component.

Furthermore, any metadata, as described above, need not be located entirely in the Segment Data portion 28, but can be located at least, in part, in the Segment prefix portion 26, such as illustrated in FIG. 2B. One way to achieve this is to modify the segment prefix length in the database description to reserve space needed for metadata. All segment prefixes are stored in a Directory Dataset.

FIG. 3 shows the layout of the data component of a segment. The Segment Prefix portion 40 of the data component contains a segment code and delete byte 46. In the present invention, the Segment Data 42 portion of the data component contains the user data 48, i.e., the data seen by a user's application program. Immediately adjacent to the user data is metadata 44 unique to this invention. Such metadata is transparent to both IMS and the user application program. One element of metadata is a born-on-date 50 which is identical to the born-on-date 36 stored in the Segment Prefix component (FIG. 2A) of the segment.

FIGS. 4A and 4B are directed to statements suitable for implementing the segment splitting feature. The standard method of describing an IMS database is via a collection of statements. These statements collectively are referred to as a DBD source module. Segment splitting is implemented by the addition of two statements to a DBD source module: (1) a DIR statement, and (2) a DIRGEN statement. FIG. 4A illustrates statements suitable for implementating the splitting of segments for a typical HIDAM database, while FIG. 4B illustrates statements suitable for implementating splitting for a typical HDAM database. It will be recognized by those skilled in the art that other methods of implementing this invention are available. However, keeping the complete database definition in a single source is believed to be the most desirable and least error prone technique.

The DIR statement in FIGS. 4A and 4B identifies the dataset which will contain the segment prefix portion of all segments in the database. The DATASET statements in FIGS. 4A and 4B identify the datasets which will contain the data portion of all segments.

The instructions for carrying out this aspect of the present invention are invoked by the IMS program at various processing points. Initially, the instructions are invoked whenever IMS attempts to Open the database. Subsequently, they are invoked whenever IMS attempts to insert a new segment into the database or retrieve an existing segment from the database.

II. Method of Maintaining Indexes

This aspect of the present invention relates to a method of maintaining primary and secondary indexes for an IMS database. The present invention defers and reduces the maintenance required to update primary and secondary index pointers subsequent to an online reorganization of an IMS HDAM or HIDAM database.

As is well known in the art, an IMS secondary index contains pointers which point at the target segments in a database. When a database is reorganized, these target segments may be relocated thus invalidating the pointers in the secondary index. Typically, a reorganization utility program is required to generate a special record which contains the information needed for the index records. Therefore, the utility program must be run in order to update the pointers in the secondary indexes to reflect the new location of the target segments. The updating of the secondary indexes cannot commence until the reorganization of the target database has completed There are several prior art index software utilities that perform this function. They all sort the index records generated by the reorganization utility and then write the sorted records into the secondary index's dataset on DASD. This additional step in the reorganization process extends the period of time that the database is unavailable to the user. The present invention defers the secondary index rebuild process, thus shortening the time that the database is unavailable to the user. The present invention updates the pointer in an index record only upon its first use. The present invention also does not require that an indirect list be maintained.

FIG. 5 illustrates the general architecture for implementing this aspect of the present invention. In the present invention, a secondary index record 50 contains: (i) a direct pointer (Ptr) 56 which points at the target segment 62 in the target database 54; (ii) the secondary index's key field 58, and (iii) a proprietary token 60 which is used to correct the direct pointer after the target database has been reorganized. The implementation of the token is unique to the present invention.

As is well known in the art, a secondary index always points at a designated segment type (target segment) in the target database. The segment type may be the root segment of a database record, or non-root segments in a database record. In either case, the pointer contains the relative byte address (RBA) of the target segment.

FIG. 6 illustrates the status of a secondary index of the present invention before reorganizing the target database, whereas FIG. 7 illustrates the status of the secondary index after reorganizing the target database. The direct pointer 56 of the secondary index record 52 points at a target segment 62. In the present invention, if target segment 62 is a root segment, then it does not need to be corrected after a reorganization. Thus, the secondary index would be the same as that illustrated in FIG. 6. If target segment 62 in the target database 54 is a non-root segment which has been moved during a reorganization, then the pointer 56 may become invalid as illustrated in FIG. 7 (i.e., it does not point to target segment 62). The direct pointer may need correcting at some point in time.

In the present invention, the following conditions will facilitate the correction of direct pointers in secondary index records after a target database has been reorganized:

1. Database root segments may not be moved during a database reorganization. For example, as is discussed below, in one embodiment of the present invention, such root segments are placed in fixed locations on the right side of a block 66 in the target database 54.
2. All non-root segments in the database may be moved during a database reorganization.
3. All segments in the Target Database contain a unique identifier, such as a token which includes the segment's born-on-date. See, e.g., FIGS. 2 and 3.
4. All Index Records in the Secondary Index contain the same unique identifier or token.
5. The token 60 in the Index Record 52 may also contain the "key" 58 of the Root Segment 64 for the Target Database record, and the born-on-date of the Index Target Segment 62 in the Target Database record.

The "key" could be either the Root Segment's key field or its RBA since both uniquely identify a root segment. "Key" 58 may also be a separate field from token 60.

IMS requires that a HIDAM primary index contain a direct pointer to the root segment. If the root segments are moved during a database reorganization, then the HIDAM primary index must be re-built to point at the root's new location. Therefore, placing root segments 64 in fixed locations, such as on the right side of a block 66, provides significant advantages which is unique to the present invention. See FIG. 6. If the root segments are retained in their storage locations and not moved during a reorganization, then the HIDAM primary index does not need re-building. In the present invention, the step of retaining a root segment in a fixed storage location can also include retaining the root segment in the same relative location within a dataset, after it has been added to the database.

The above description refers to storage locations called "blocks." In IMS, a "block" typically refers to one row of data in memory containing multiple rows. Those skilled in the art will appreciate, however, that the present invention is applicable to multiple configurations and types of memory and storage, and the use of the term "block" herein does not limit the scope of the invention to a particular configuration or type of memory or storage.

FIG. 8 illustrates the logic flow of a program that could be utilized by the IMS program to carry out this aspect of the present invention. Such a program would be utilized by the IMS program at the point in time that it receives a request from an application program (A/P) for a database segment via a secondary index. The programming conventions used by an A/P when requesting services from IMS using the DLI Call interface are known in the art.

In step 68 of FIG. 8, when IMS receives an A/P request to retrieve a target segment via a secondary index, it extracts the index's key from the A/P's read request. This key is then used to read an Index Record from the secondary index's dataset in step 70. A Direct Pointer (RBA) to the Target Segment in the Target Database is then extracted from the Index Record in Step 72.

In step 74, when IMS retrieves the data at the specified RBA, a check is made to insure that it contains a valid Target Segment. To determine if it is a valid Target Segment, IMS first checks the segment code of the data at the specified RBA and compares it to the actual segment code, which is maintained in the index record, for the Target Segment. The segment code is the first byte of each segment. If the segment codes do not match, then it is determined that a valid Target Segment was not found. If the segment codes match, then a valid Target Segment may have been found, but a second check is made. For the second check, the born-on-date (or other unique identifier) in the token of the segment data at the specified RBA is compared to the born-on-date (or other unique identifier), which is maintained in the token field of the index record, for the target segment. If the born-on-dates do not match, then a valid target was not found.

If the target RBA contains a valid Target Segment, normal processing continues. If the target RBA does not contain a valid Target Segment, then in step 76 a program, such as the one described below in connection with FIG. 9, can be invoked to resolve the problem.

FIG. 9 illustrates the logic flow of a program that would be suitable for correcting the Direct Pointer in the secondary index record. First, in step 78, the information needed to resolve the direct pointer is extracted from the Token field in the Secondary Index record. The Token can contain the following pieces of metadata which uniquely identifies a specific Target Segment in the Target Database: (1) the Key of the Root Segment which contains the Target Segment; and (2) the Born-On-Date (BOD) of the Target Segment which is contained in the Token of the Target Segment. These two pieces of metadata are extracted in step 80.

In step 82, the program requests IMS to read the specified Root Segment and all of its dependent segments. As each dependent segment is retrieved in step 84, its Token is examined to check for a matching BOD. When the valid Target Segment is encountered, in step 86 its location (i.e., RBA) is then placed into the Secondary Index record. Thus, the Secondary Index record is now corrected for subsequent references to it.

III. Ensuring that a Database and its Definition are Synchronized

This aspect of the present invention relates to a method of verifying that the correct IMS control blocks are used when processing an IMS HDAM or HIDAM database.

As is well known in the art, prior to loading an IMS database there are a number of administrative functions which must be performed. One of those functions is the creation of a description of the proposed database. This description is referred to as a Data Base Description (DBD). The database description may also be referred to as the database definition. The DBD contains a number of source statements which describe the physical characteristics of the database. These source statements must be assembled and link edited, and the resulting load module is placed into a DBD library. Subsequently, the DBD may be converted into a Data Management Block (DMB), by the IMS-provided ACB Generation utility program. As illustrated in FIGS. 10 and 11, the resulting DMB is stored in an ACB library.

The actual loading of user data into a database is initiated and under the control of a load program 94, such as a user-written load program or the IMS-provided HD Reorganization Reload utility program. In either case, when initially invoked the IMS software will extract the specified DBD from a DBD library and convert it into a DMB (not shown), or extract the DMB 90 from a ACB library 92 (see FIG. 10) and place DMB into DMB pool 96. In FIG. 10, the DMB in buffer pool 96 is identified by reference numeral 98. The DMB is the control block which IMS uses to manage the loading of user data into an IMS database. It is also the control block used to subsequently process the database. It is the user's responsibility to provide the DMB for IMS to use. IMS has no way of knowing if the DMB used to create the database is identical to the DMB which should be used to subsequently process the database. If they are different, the integrity of the database is at risk.

FIG. 10 further illustrates that, in the present invention, a copy of the DMB used to load the database is saved in the database. At the point in time when the IMS software opens the database datasets for loading, a program 100 obtains control to initialize itself. Program 100 obtains a copy of the DMB from IMS and stores it into the Directory Dataset 102 of the database 104. In FIG. 10, the DMB in Directory Dataset 102 is identified as reference manual 106. The DMB 106 thus becomes a permanent part of the database. The DMB is stored within the database as one or more database records and assigned a unique location, such as the first records of the database. After the DMB used to load the database is stored in the database, it is maintained there.

FIG. 11 depicts what happens when a user program is scheduled to process the database 104. The IMS software must first obtain a DMB 90 which describes the user-requested database. The DMB may be dynamically constructed from a DBD found in a DBD library or a previously generated DMB found in an ACB library may be used. At the point in time when the IMS software opens the database datasets for processing, program 100 obtains control. Program 100 extracts a copy of the DMB 98 built by IMS and also extracts the DMB 106 from the database 104 that was placed there when the database was loaded (see FIG. 10). These two DMBs are compared. The physical characteristics described in these two DMBs should be identical. If they are not synchronized, subsequent processing of the database could cause any number of serious database integrity problems. To prevent any database damage, Program 100 alerts the user, and/or suspends any further processing of database 104 at least until the two database definitions become synchronized.

IV. Employing Units of Work

This aspect of the present invention relates to a method of implementing a unit of work (UOW) architecture in an IMS HDAM or HIDAM database.

As is well known in the art, the "unit of work" terminology is quite widely used in the data processing industry. However, it has many different meanings. Even within IBM's relational and hierarchical DBMS products it has a different meaning.

In the present invention, use of the "unit of work" term is most similar to the use of the term by IBM's Fast Path (DEDB) IMS product. However, the present invention's implementation differs from IBM's IMS implementation in at least three significant ways. First, the IBM unit of work implementation applies to Fast Path (DEDB) databases only, whereas in the present invention units of work can apply to HDAM and HIDAM databases. Second, IBM's Fast Path implementation does not provide index access, whereas the present invention does provide such access. Third, IBM's Fast Path implementation does not provide logical relationship support with other Fast Path databases, whereas the present invention has no restrictions on the normal logical relationship support provided for HDAM and HIDAM databases. There are other differences between the two implementations of the unit of work concept that will be apparent to those skilled in the art.

A unit or work (UQW), as implemented in the present invention, consists of a user-defined number of blocks of DASD storage within a database dataset, for storing a group of one or more database records. The user also defines the number of UOWs within the database. Each UOW consists of three separate areas. These areas, illustrated in FIG. 12, are referred to as Prime area 110, Dependent Overflow area 112, and Independent Overflow area 114. The example shown in FIG. 12 depicts a UOW 108 with ten DASD storage blocks 116 allocated to the Prime area, five storage blocks 1118 allocated to the Dependent Overflow area 112, and two storage blocks 120 allocated to the Independent Overflow area 114. Each UOW 108 in a given database will have the same number of blocks 116, 118 (e.g., fifteen blocks in FIG. 12) assigned to the Prime and Dependent Overflow areas. Independent Overflow blocks 120 are assigned to a UOW 108 as they are needed, thus the number of Independent Overflow blocks per UOW will vary.

A UOW definition is placed in the DBD source module. See FIGS. 4A and 4B. The definition is identified via a UOW keyword operand in the DIR statement. The UOW operand defines the number and size of the UOWs. The DIR statement 122 in FIG. 4A provides that the HIDAM database is to have ten UOWs, with each UOW having five-hundred blocks allocated to each Prime area and fifty blocks allocated to each Dependent Overflow area.

The DIR statement 124 in FIG. 4B provides that the HDAM database is to have one-hundred blocks allocated to each Prime area and ten blocks allocated to each Dependent Overflow area. The number of UOWs is determined by the size of the Root Addressable Area (RAA).

One aspect of the present invention's implementation of the UOW concept is that the user can control and select into which UOW a given database record is placed. Once a UOW is selected, the root segment and all dependent segments for that database record must be contained within that same UOW. The user's UOW selections can be specified as part of the database description.

Another aspect of the present invention is the placement of the UOW areas. FIG. 13 depicts the placement of UOW areas in an HDAM database. In FIG. 13, all UOW Prime areas 128 are placed within the HDAM root addressable area (RAA) 132 and all UOW Dependent Overflow areas 130 are placed within the HDAM overflow area 134. All DASD space after the last UOW Dependent Overflow area 136 is allocated to Independent Overflow 138. When a UOW needs additional space, a block is obtained from the Independent Overflow area 138 and assigned to the requesting UOW 108.

FIG. 14 illustrates the placement of UOW areas in a HIDAM database. Note that all Prime UOW areas 128 are placed into contiguous blocks on DASD followed by all Dependent Overflow UOW areas 130. All DASD space after the last Dependent Overflow UOW area 136 is allocated to Independent Overflow 138. As with the HDAM implementation, blocks from the Independent Overflow area are assigned to UOWs as they are needed.

FIGS. 12–14 also illustrate the presence of an area 126 referred to as "Data Base Description". This area 126 consists of one or more blocks of storage and contains the description of the database and of the UOWs. Its placement will vary depending upon whether it is an HDAM or HIDAM database. For example, if it is an HDAM database, the database description is placed outside of the prime area. It is created at the time the database is loaded and is accessed each time the database is opened. See Section III, "Ensuring That A Database And Its Definition Are Synchronized," above.

The composition of a storage block 116 or 118 (see FIG. 12) within a Prime 110 or Dependent 112 Overflow UOW area (see FIG. 12) is shown in FIG. 15. The storage block includes two IMS required fields, FSEAP 140 and RAPs 141, followed by space 147 for storing root and non-root segment data. The placement of database record segments within space 147 of the block is described below in Section V, "Management of Space with a DASD Block." (See FIG. 18). FIG. 16 shows the composition of a storage blocks 120 (see FIG. 12) in an Independent Overflow area 114 (see FIG. 12). Note that the blocks of FIG. 16 differ from the blocks of FIG. 15 in that the FSEAP field 140 is followed by two 4-byte fields, the UOW ID field 143 and the chain field 145, which are used to connect all Independent Overflow blocks for a given UOW.

One significant benefit of the present invention is that it facilitates a non-disruptive, online, database reorganization, thus allowing a 24 hour×365 day database availability. Since a complete database record is always stored within a given UOW and each UOW is independent from all other UOWs, it is possible to "lock out" a given UOW from user read and write access while it is being reorganized or otherwise processed. The duration of the "lock out" is determined by the size of the UOW. However, it is anticipated that a typical "lock out" will be measured in seconds. While a given UOW is "locked out" all other UOWs are online and available for processing. Thus, a batch of records may be reorganized while the other records are online. Furthermore, the batch of records will generally be offline for only a brief, non-disruptive period of time.

The UOW implementation also allows the entire database to be taken offline for reorganization. Since UOWs are independent of each other, all UOWs may be reorganized concurrently in parallel, while the database is offline. This type of reorganization would also significantly reduce the unavailability of the database. Similarly, the UOWs may be reorganized sequentially.

Employing UOWs for full function databases also allows the users of such databases to control or direct the placement of database data. For example, users may find it advantageous to direct that all database records pertaining to a certain classification or group (e.g., geographic location or customer group) be placed in one or more UOWs independent from other UOWs.

Subsequent to the UOW reorganization, all index pointers which pointed into the UOW may be updated as described above in Section II, "Method of Maintaining Indexes."

V. Management of Space within a DASD Block

This aspect of the present invention pertains to the management of space within memory, such as within a dataset block of DASD storage, for HDAM and HIDAM IMS databases. Space management facilitates many of the features described in Sections I through IV, above. For example, space management, in accordance with the present invention, can direct the placement of split segment prefixes and segment data into the appropriate datasets (see Section I, "Splitting the Segments' Prefix from the Segments' Data," above). Space management can also direct the placement of root segments into fixed storage locations to facilitate the maintenance of indexes. (See Section II, "Method of Maintaining Indexes," above.) If UOWs are to be implemented, space management can further direct the placement of root and non-root segments, or segment prefixes, into the appropriate UOW. In addition, space management is responsible for the management of DASD space allocated to UOWs. (See Section IV, "Employing Units of Work," above.)

Space management, in accordance with the present invention, supplements that portion of the IMS program which manages space for HDAM and HIDAM databases. The space management process of the present invention is invoked under two different conditions: (1) during loading of a database; and (2) during subsequent updating of a database. The space management process allows database data to be stored in unique ways, based on user preferences, such as: with the prefix and data portions of segments split; with UOWs provided; and/or with root segments stored in fixed locations. As discussed above, having data stored in these unique ways, facilitates many of the features of the present invention.

Those skilled in the art are aware that the IMS program places segments into storage blocks in a left-to-right fashion. FIG. 17 illustrates the composition of an exemplary storage block 146 after IMS has inserted root segments 142 and non-root (also known as dependent) segments 144. Any unused used space in storage block 146 is considered Free Space. Such Free Space 148 is located on the right side of block 146.

FIG. 18 illustrates the composition of that same block 146 if IMS had invoked the space management process of the present invention to insert the same segments in the same sequence. All dependent segments 144 are now placed in the left side of the block and all root segments 142 are placed on the right side of the block. The Free Space 148, if any, is located in between. As illustrated, the root segments 142 in block 146 can be stored in contiguous storage locations on the right side of the block.

It will be apparent to those skilled in the art that both techniques use the same amount of space within a storage block. It should also be apparent that the performance implications to process segments in either block are about the same. As discussed above, one advantage of the placement of root segments in fixed locations (e.g., the right side of the block) in accordance with the present invention is that correction or maintenance of the primary index is no longer necessary subsequent to the reorganization of the database. See Section II, "Method of Maintaining Indexes."

Subsequent to the database being loaded, the space management process is invoked whenever IMS attempts to insert a segment into or otherwise update the database. The process used for placement of segments into a block at database load time, as illustrated in FIG. 18, is also used as the database is updated after loading. If a Root segment 142 is being inserted, a search for free space begins on the right side of block 146. Existing Root segments are skipped over until either free space 148 or a Dependent segment 144 is encountered. If a Dependent segment 144 is encountered before finding free space 148, then another block 146 is searched for free space, and the process is repeated.

If a Dependent segment 144 is being inserted, then the search for free space 148 preferably begins on the left side of the block 146 containing its Root segment. If a Root segment 142 is encountered before finding free space 148, then another block is searched for free space, and the process is repeated.

FIGS. 19 and 20 illustrate the logic flow of software suitable for carrying out the loading and subsequent updating of non-separated root and non-root segments for an IMS HDAM or HIDAM database, wherein the root segments are stored in fixed storage locations, using the space management process of the present invention. Such software is based on the assumption that the IMS program is the standard, IBM-provided software which operates in an IMS Batch or Online Region. It is expected that those with ordinary skill in the art will understand the operation and user interfaces to the IMS software system.

FIG. 19 illustrates the logic flow of software suitable for carrying out the space management process during loading of a database. Separate software is used for loading the database, such as the standard IBM-provided HD Reorganization Reload Utility or a user-written load program using the DLI interface. Such software begins the loading process in step 111. At the point in time when IMS opens the databases' datasets, the space management software is invoked as described below.

When the space management software initially assumes control from IMS in step 121, it: (i) obtains the memory address of various control blocks built and used by IMS; and (ii) initializes itself. Information about the database, primarily from the Data Management Block, is extracted and used by the software to initialize itself. A "hook" is also placed into the IMS software which allows the space management software to gain control whenever IMS attempts to insert a segment into the database. In step 131, discussed below, control is then passed back to IMS.

In step 131, the IMS program proceeds to begin processing the user's input data found in the required HD Unload Dataset. As each input record is read, IMS builds a segment (prefix and user data) in memory. In step 141, at the point when IMS attempts to search for a storage block in which to place the segment, the space management software regains control. The software then analyzes the segment to be inserted and conducts the search for the most desirable storage block. This search varies by segment type (root segment versus dependent segment) and by database organization (HDAM versus HIDAM). If the segment is a root segment, then the most desirable block varies depending on whether its HDAM or HIDAM. As is known by those skilled in the art, for HDAM databases, the user's randomizer generally determines which block is the most desirable, whereas for HIDAM databases, the most desirable block is generally the block containing the root segment with the next highest key. If the segment being inserted is a non-root segment, then preferably it is assigned to the same block as its parent or root segment. The storing of non-root segments in the same block as their root segment may (i) reduce or eliminate the problem of data being stored in a DASD in a fragmented manner; and (ii) reduce I/O operations, if searches or retrieval of non-root segments can be focused on the block containing the root segment of such non-root segments.

After a block is located, the software then further analyzes the segment being inserted, in step 150. If the segment is a root segment, then it attempts to place it on the right side of a block (or other fixed location). If it is a non-root segment, then it attempts to place it on the left side of a block (or another position separate from the fixed root segment location). This process is further described above in connection with FIG. 18.

In step 160, the software inserts the segment into the selected location. In step 170, the software then modifies the IMS control blocks to reflect the location where the segment was inserted. In step 170, control is then passed back to IMS.

When IMS regains control (step 170), it continues the segment insert process that was interrupted. IMS is unaware that its control blocks were just altered. The IMS program then goes back to step 131 to get the next user record for insertion. This cycle continues until all user records have been processed, at which time all database datasets are closed.

FIG. 20 illustrates the logic flow of software suitable for carrying out the space management process during subsequent processing or updating of an IMS HDAM or HIDAM database. When the user of the database requests that a segment be added to the database, IMS routes control to its insert processing sub-program in step 210. In step 220, the insert processing routine builds a complete segment in memory, containing both the prefix and data portions.

When IMS attempts to insert the new segment into the database, it is intercepted by the space management software in step 230. The software searches for the most desirable block in which to place the segment being inserted. If the segment is a root segment, then the most desirable block varies depending on whether its HDAM or HIDAM. As is known by those skilled in the art, for HDAM databases, the user's randomizer generally determines which block is the most desirable, whereas for HIDAM databases, the most desirable block is generally the block containing the root segment with the next highest key. If the segment being inserted is a non-root segment, then preferably it is assigned to the same block as its parent or root segment. As discussed above, the storing of non-root segments in the same block as their root segment may (i) reduce or eliminate the problem of data being stored in a DASD in a fragmented manner; and (ii) reduce I/O operations, if searches or retrieval of non-root segments can be focused on the block containing the root segment of such non-root segments. In step 240, the space management software then searches the selected block for space using the process described above in connection with step 150 of FIG. 19.

In step 250, the software inserts the segment into the selected location. In step 260, the IMS control blocks are then altered to reflect the location where the segment was inserted into the DASD block selected by the space management software. Control is then passed back to IMS The space management software can also manage space within storage blocks during the reorganization process. During the reorganization unload process, an unload utility program, such as the IMS HD Reorganization Unload utility program, is used. This utility program extracts the segments from the database in hierarchical sequential order. It also appends a special prefix to each segment and places it into an output dataset. Included in this prefix is the segment's identification and where it was found in the database. During the reorganization reload process, a load utility program, such as the IMS HD Reorganization Reload utility program is used. This utility program reads the segments from the dataset created by the unload utility. It then calls IMS to insert the segments into the database. The space management software can be used to intercept this request and performs the insertion of the segment data into the database as described above in conjunction with FIG. 19. Using the information in the special prefix, all root segments can be placed back into the same location as they were at unload time. Dependent segments will be placed in other storage blocks as described above.

For HIDAM databases, one advantage of the present invention is that the root segments are not relocated during the reorganization process. If root segments are not relocated, then the HIDAM Primary Index is still intact, i.e., it does not need to be rebuilt. Additionally, any secondary indexes whose target segment is a Root segment will not need to be rebuilt.

FIGS. 19 and 20, discussed above, illustrate the logic flow of software suitable for placing non-separated root and non-root segments in blocks, per the space management process of the present invention. FIGS. 21 and 22, discussed below, illustrate the logic flow of software which additionally is suitable for and capable of both: (i) directing the separation and placement of the prefix and data components of each such segment, according to the present invention; and (ii) placing each such segment with a prefix portion in a UOW, according to the present invention. More particularly, FIG. 21 pertains to the execution of these steps during the loading of a database, whereas FIG. 22 pertains to the execution of these steps during the updating of the database. Alternatively, the software can place non-separated segments into UOWs, or direct the separation and placement of prefix and data components wherein UOWs are not employed.

The steps illustrated in FIG. 21 are the same as those described in connection with FIG. 19, with some exceptions. In particular, steps 310, 320, 330, and 380 of FIG. 21 correspond to the aforementioned steps 111, 121, 131, and 170 of FIG. 19. In the space management process of FIG. 21, at the point that IMS attempts to insert a segment into the database the space management software gains control of the process. If UOWs are to be employed, the segment is assigned to a particular UOW in step 340. If the segment is a root segment and UOWs are to be employed, then the segment is assigned to any UOW having space. All non-root segments are assigned to the same UOW that contains the root of the non-root segments.

In step 342, the space management software then searches for space within the Directory Dataset, or the selected UOW within the Dataset if UOWs are to be employed, to store the segment. If the segment is to be split, the space management software searches for an amount of space to store the new segment which will comprise the split prefix component and a data link and/or other metadata. The process for selecting the location of the segment follows the same process used for selecting the location of a segment which is described above in connection with FIGS. 19 and 20. For example, if the segment to be inserted is a new segment resulting from splitting, and the prefix component of the new segment is for a root segment, the new segment can be considered and treated as a root segment. Thus, such segments can be placed in fixed locations on the right side of a block. If the prefix components are for non-root segments, then the new segments can be considered and treated as non-root segments, and can be placed on the left side of blocks. Also, such non-root segments are preferably stored in the same block as the root segment.

Next, in step 345, if the segment is to be separated, the prefix component of the segment is stripped off and appended with a data link and/or other metadata to create a new segment, such as is shown in FIG. 2A. The data link or metadata is built before it is appended to the prefix component. The user data component is also appended with a data link and/or other metadata, such as is shown in FIG. 3, to become a new segment.

In step 350, the software inserts the segment, or the new segment containing the prefix component if the segment is split, into the selected location in the Directory Dataset, or a UOW within the Dataset.

In step 360, the space management software then determines which Segdata Dataset should contain the new segment having the user data component. The selection of the Segdata Dataset is based on the user's specifications. In step 370, the software inserts the new segment containing the user data component into a selected location in the selected Segdata dataset. The software can select the location in the selected Segdata Dataset using any one of various methods, including the method employed in the IMS software for selecting a location in a dataset to store a segment. In step 380, the IMS control blocks are modified to reflect where the segment containing the prefix component and the segment containing the data component where located by the space management software.

When IMS regains control in step 380, it continues the segment insert process that was interrupted. IMS is unaware that its control blocks were just altered The IMS program then goes back to step 330 to get the next user record for insertion. This cycle continues until all user records have been processed at which time all database datasets are closed.

FIG. 22 illustrates this space management process during the subsequent processing of an IMS HDAM or HIDAM database. When the user of the database requests that a segment be added to the database, IMS routes control to its insert processing sub-program in step 410. In step 420, the insert processing routine builds a complete segment in memory containing both the prefix and data components.

In step 430, when IMS attempts to insert the new segment into the database, it is intercepted by the space management software. As with the process that occurs at database load time, in step 430 the software assigns the segment being inserted to a UOW if UOWs are to be employed. In step 440, the software then searches for space within the Directory Dataset, or a UOW within the Directory Dataset if UOWs are employed, to insert the segment containing the prefix component. If the segment is to be split, the software searches for an amount of space to store the new segment which will comprise the split prefix component and a data link and/or other metadata. The process for selecting the location of the segment follows the same process used for selecting the location of a segment, which is described above in connection with FIGS. 19–21.

In step 445, if the prefix and data components of the segment are to be separated, the software strips off the prefix component of the segment and appends it with a data link and/or other metadata to create a new segment, such as is shown in FIG. 2A. The user data component is also appended with a data link and/or other metadata, such as is shown in FIG. 3, and becomes a new segment.

In step 450, the software inserts the segment, or the new segment containing the prefix component if the segment is split, into the selected location in the Directory Dataset, or a UOW within the Dataset.

In step 460, the software next determines which Segdata Dataset should contain the segment containing the user data component. In step 470, the software then inserts the segment containing the data component into a selected location in the selected Segdata Dataset. In step 480, the IMS control blocks are then altered, and control is then passed back to IMS VI. Other Employing the above-discussed features and functions of the present invention results in many advantages to IMS database users. Many of these advantages are discussed above and/or will be apparent to those skilled in the art. Some noteworthy advantages include improved database: (i) response time; (ii) availability; and (iii) capacity. For example, splitting segments and storing segment data in datasets separate from the directory dataset allows increased database capacity. The directory dataset can hold more database segments since it only stores the segment prefixes and not the segment data.

Since less data needs to be stored in the directory dataset, the database's response time may decrease and availability may increase. Furthermore, the segment data can be stored in less expensive and more modern storage technologies versus the storage used in the prior art.

If UOWs are employed, the data in an individual UOW may be reorganized while the other UOWs are on-line. This allows an on-line, or near on-line, and non-disruptive database reorganization. If the data in the UOWs is only segment prefix data, as a result of splitting, the unavailability of individual UOWs during reorganization is even more limited.

In addition, if the method of maintaining indexes is employed, after reorganization of a database or a UOW, the database is available for immediate use. There is no need, as in the prior art, to first rebuild the indexes before the database is available to the user. In the present invention, if root segments are not moved during reorganization, the primary index does not have to be rebuilt. The secondary index also does not need to be completely rebuilt before the database can be used. Instead, the secondary index can be updated over time as invalid pointers are encountered during accesses to non-root segments. Furthermore, an up-to-date indirect list does not have to be maintained.

Those skilled in the art will appreciate that any software program instructions of the present invention are capable of being distributed as one or more program products, in a variety of forms, and that the present invention applies equally regardless of the particular type of program storage media used to actually carry out the distribution. Examples of program storage media include recordable type media such as floppy disks, CD-ROM, and magnetic tape transmission type media such as digital and analog communications links, as well as other media storage and distribution systems.

Additionally, the foregoing detailed description has set forth various embodiments of the present invention via the use of block diagrams, flowcharts, and/or examples. It will be understood by those skilled within the art that each block diagram component, flowchart step, and operations and/or components illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, may be implemented in standard Integrated Circuits, as a computer program running on a general-purpose machine having appropriate hardware, such as one or more computers, as firmware, or as virtually any combination thereof and that designing the circuitry and/or writing the code for the software or firmware would be well within the skill of one of ordinary skill in the art, in view of this disclosure.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method of facilitating correction of an index after a reorganization of data in a database, wherein said index comprises index entries, said database comprises one or more records, each said record comprises one or more segments, and each index entry comprises an address to a target segment, the method comprising:

prior to a reorganization of data in said database, assigning a unique token to each target segment and each corresponding index entry having an address to a target segment, wherein said unique token for a given target segment and for a corresponding index entry is the same;

after a reorganization of data in said database, reading the unique token of a first index entry;

reading the unique token of each target segment until a match is found between the unique token of a matching target segment and the unique token of said first index entry;

determining the address of said matching target segment; and replacing the address of said first index entry with the address of said matching target segment.

2. The method of claim 1, wherein said database is an IMS database.

3. The method of claim 1, wherein after a reorganization of data in said database but before taking steps to correct said address of said first index entry, determining if said address of said first index entry is valid and then correcting said address only if it is invalid.

4. The method of claim 3, wherein determining if said address of said first index entry is valid comprises comparing the unique token of said first index entry to the unique token associated with a segment located at said address, and ascertaining if said unique tokens are the same.

5. The method of claim 3, wherein determining if said address of said first index entry is valid comprises comparing a segment code of said first index entry to a segment code associated with a segment located at said address, and if said segment codes are the same, then comparing the unique token of said first index entry to the unique token associated with said segment located at said address, and ascertaining if said unique tokens are the same.

6. A program storage media readable by a machine and containing instructions for performing the method contained in claim 1.

7. A method of facilitating correction of an index after a reorganization of data in a database, wherein said index comprises index entries, said database comprises one or more records, each said record comprises a root segment and one or more non-root segments, and each index entry comprises an address to a target segment included within said root and non-root segments, the method comprising:

prior to a reorganization of data in said database, assigning a unique token to each target segment and each corresponding index entry having an address to a target segment, wherein said unique token for a given target segment and for a corresponding index entry is the same;

after a reorganization of data in said database, reading the unique token of a first index entry for a first record;

reading the unique token of each non-root segment within said first record until a match is found between the unique token of a matching target segment and the unique token of said first index entry;

determining the address of said matching target segment; and replacing the address of said first index entry with the address of said matching target segment.

8. The method of claim 7, wherein said index which is to be corrected is a secondary index.

9. The method of claim 8, wherein said database is an IMS database.

10. The method of claim 7, wherein said database is an IMS database.

11. The method of claim 7, wherein each said unique token includes one or more the following: (i) a born on date of the target segment to which said unique token is assigned; or (ii) a key field of the target segment to which said unique token is assigned.

12. The method of claim 7, wherein after a reorganization of data in said database but before taking steps to correct said address of said first index entry, determining if said address of said first index entry is valid and then correcting said address only if it is invalid.

13. The method of claim 12, wherein determining if said address of said first index entry is valid comprises comparing the unique token of said first index entry to the unique token associated with a segment located at said address, and ascertaining if said unique tokens are the same.

14. The method of claim 12, wherein determining if said address of said first index entry is valid comprises comparing a segment code of said first index entry to a segment code associated with a segment located at said address, and if said segment codes are the same, then comparing the unique token of said first index entry to the unique token associated with said segment located at said address, and ascertaining if said unique tokens are the same.

15. A program storage media readable by a machine and containing instructions for performing the method contained in claim 7.

16. A method of facilitating correction of an index after a reorganization of data in a database, wherein said index comprises index entries, said database comprises one or more records, each said record comprises a root segment and one or more non-root segments, and each index entry comprises an address to a target segment included within said root and non-root segments, wherein said root segment and one or more non-root segments for a record are stored within a block of storage locations, the method comprising:

prior to a reorganization of data in said database, assigning a unique token to each target segment and each corresponding index entry having an address to a target segment, wherein said unique token for a given target segment and for a corresponding index entry is the same;

after a reorganization of data in said database, reading the unique token of a first index entry for a first record;

reading the unique token of each non-root segment within said first record until a match is found between the unique token of a matching target segment and the unique token of said first index entry;

determining the address of said matching target segment; and replacing the address of said first index entry with the address of said matching target segment.

17. The method of claim 16, wherein said index which is to be corrected is a secondary index.

18. The method of claim 17, wherein said database is an IMS database.

19. The method of claim 16, wherein said database is an IMS database.

20. The method of claim 16, wherein each said root segment is stored in a fixed storage location prior to a reorganization of data in said database, and said root segment is retained in said fixed storage location during a reorganization.

21. The method of claim 16, wherein each said unique token is includes one or more the following: (i) a born on date of the target segment to which said unique token is assigned; or (ii) a key field of the target segment to which said unique token is assigned.

22. The method of claim 16, wherein after a reorganization of data in said database but before taking steps to correct said address of said first index entry, determining if said address of said first index entry is valid and then correcting said address only if it is invalid.

23. The method of claim 22, wherein determining if said address of said first index entry is valid comprises comparing the unique token of said first index entry to the unique token associated with a segment located at said address, and ascertaining if said unique tokens are the same.

24. The method of claim 22, wherein determining if said address of said first index entry is valid comprises comparing a segment code of said first index entry to a segment code associated with a segment located at said address, and if said segment codes are the same, then comparing the unique token of said first index entry to the unique token associated with said segment located at said address, and ascertaining if said unique tokens are the same.

25. A program storage media readable by a machine and containing instructions for performing the method contained in claim 16.

26. A method of facilitating correction of an index after a reorganization of data in a database, wherein said index comprises index entries, said database comprises one or more records, each said record comprises a root segment and one or more non-root segments, each root and non-root segment comprises a prefix component and a data component, and each index entry comprises an address to the prefix component of a target segment included within said root and non-root segments, the method comprising:

prior to a reorganization of data in said database, assigning a unique token to the prefix component of each target segment and each corresponding index entry having an address to the prefix component of a target segment, wherein said unique token for the prefix component of a given target segment and for a corresponding index entry is the same;

after a reorganization of data in said database, reading the unique token of a first index entry for a first record;

reading the unique token of the prefix component of each non-root segment within said first record until a match is found between the unique token of a matching target segment prefix component and the unique token of said first index entry;

determining the address of said matching target segment prefix component; and replacing the address of said first index entry with the address of said matching target segment prefix component.

27. The method of claim 26, wherein said index which is to be corrected is a secondary index.

28. The method of claim 26, wherein said database is an IMS database.

29. The method of claim 26, wherein each said root segment is stored in a fixed storage location prior to a reorganization of data in said database, and said root segment is retained in said fixed storage location during a reorganization.

30. The method of claim 26, wherein each index entry and each non-root target segment further comprise a root segment identifier which identifies what root segment said non-root target segment is associated with, and each identified root segment comprises addresses to all non-root segments, within a record, associated with said identified root segment.

31. The method of claim 30, wherein each said unique token includes one or more the following: (i) a born on date of the target segment to which said unique token is assigned; or (ii) a key field of the target segment to which said unique token is assigned.

32. The method of claim 31, wherein each said unique token for an index entry and each non-root target segment further comprises said root segment identifier which identifies what root segment said non-root target segment is associated with.

33. The method of claim 30, wherein said database is an IMS database.

34. The method of claim 30, wherein said index which is to be corrected is a secondary index.

35. The method of claim 26, wherein each said unique token includes one or more the following: (i) a born on date of the target segment to which said unique token is assigned; or (ii) a key field of the target segment to which said unique token is assigned.

36. The method of claim 26, wherein after a reorganization of data in said database but before taking steps to correct said address of said first index entry, determining if said address of said first index entry is valid and then correcting said address only if it is invalid.

37. The method of claim 36, wherein determining if said address of said first index entry is valid comprises comparing the unique token of said first index entry to the unique token associated with a prefix component of a segment located at said address, and ascertaining if said unique tokens are the same.

38. The method of claim 36, wherein determining if said address of said first index entry is valid comprises comparing a segment code of said first index entry to a segment code associated with a prefix component of a segment located at said address, and if said segment codes are the same, then comparing the unique token of said first index entry to the unique token associated with said prefix component of a segment located at said address, and ascertaining if said unique tokens are the same.

39. A program storage media readable by a machine and containing instructions for performing the method contained in claim 26.

* * * * *